(12) United States Patent
Uziel et al.

(10) Patent No.: US 12,389,263 B2
(45) Date of Patent: Aug. 12, 2025

(54) SERVICE LEVEL BASED OPERATION MODES OF RADIO UNITS

(71) Applicant: QUALCOMM Incorporated, San Diego, CA (US)

(72) Inventors: Lior Uziel, Hod Hasharon (IL); Guy Wolf, Rosh Haayin (IL)

(73) Assignee: QUALCOMM Incorporated, San Diego, CA (US)

( * ) Notice: Subject to any disclaimer, the term of this patent is extended or adjusted under 35 U.S.C. 154(b) by 343 days.

(21) Appl. No.: 17/645,582

(22) Filed: Dec. 22, 2021

(65) Prior Publication Data

US 2023/0199553 A1    Jun. 22, 2023

(51) Int. Cl.
*H04W 28/02* (2009.01)
*H04W 4/50* (2018.01)
*H04W 24/02* (2009.01)

(52) U.S. Cl.
CPC ......... *H04W 28/0268* (2013.01); *H04W 4/50* (2018.02); *H04W 24/02* (2013.01)

(58) Field of Classification Search
CPC ... H04W 4/50; H04W 24/02; H04W 28/0268; H04W 88/085
See application file for complete search history.

(56) References Cited

U.S. PATENT DOCUMENTS

| | | | | |
|---|---|---|---|---|
| 2018/0242349 A1* | 8/2018 | Noh | ...................... | H04W 72/56 |
| 2019/0200373 A1* | 6/2019 | Becvar | .................. | H04L 5/0096 |
| 2019/0222375 A1* | 7/2019 | Wu | ........................ | H04L 5/0035 |
| 2020/0235788 A1* | 7/2020 | Rajagopal | ............ | H04B 7/0848 |
| 2020/0287785 A1 | 9/2020 | Barabell | | |
| 2021/0099971 A1* | 4/2021 | Raghothaman | ..... | H04W 64/006 |
| 2021/0243617 A1* | 8/2021 | Cooper | ............. | H04W 72/0453 |
| 2021/0289585 A1* | 9/2021 | Seki | ........................ | H04L 47/70 |
| 2021/0321390 A1* | 10/2021 | Muta | .................... | H04W 88/085 |
| 2021/0321407 A1* | 10/2021 | Matsuo | ................ | H04W 88/085 |
| 2022/0052806 A1* | 2/2022 | Österling | ................ | H04L 69/04 |
| 2022/0369163 A1* | 11/2022 | Gundavelli | ........... | H04W 88/06 |
| 2023/0028175 A1* | 1/2023 | Ogawa | .................. | H04W 24/02 |
| 2023/0029784 A1* | 2/2023 | Navon | .................... | H04W 8/24 |
| 2023/0209549 A1* | 6/2023 | Amuru | .................. | H04W 28/02 370/329 |
| 2023/0231686 A1* | 7/2023 | Jeon | ...................... | H04L 5/0091 370/329 |

(Continued)

OTHER PUBLICATIONS

International Search Report and Written Opinion—PCT/US2022/080501—ISA/EPO—Mar. 24, 2023.

(Continued)

*Primary Examiner* — Kan Yuen
(74) *Attorney, Agent, or Firm* — Harrity & Harrity LLP

(57) ABSTRACT

Various aspects of the present disclosure generally relate to wireless communication. In some aspects, a radio unit (RU) may receive, from a distributed unit (DU), an indication of a service level based operation mode, from a set of multiple candidate service level based operation modes, to use for transmitting or receiving a front haul communication. The RU may transmit or receive the front haul communication having a level of layer 1 processing that is based at least in part on the service level based operation mode. Numerous other aspects are described.

28 Claims, 11 Drawing Sheets

(56) References Cited

U.S. PATENT DOCUMENTS

2023/0397198 A1* 12/2023 Turtinen .............. H04W 24/08
2024/0147528 A1* 5/2024 Lehti ................. H04W 74/0808

OTHER PUBLICATIONS

Jun Shan Wey ZTE China: "5G Wireless Fronthaul Requirements in a Passive Optical Network Context: TD", ITU-T Draft, Study Period 2017-2020, Study Group 15, Series TD, International Telecommunication Union, Geneva, CH, vol. 2/15, Jun. 19, 2018, XP044246510, 44 Pages, 6.2 Functional Split in the Fronthaul Link, 6.2.2 New Functional Split Options in 5G wireless network, Figure 6.4, Figure 6.5, 7.2 Transport Bandwidth Requirements.

Larsen L.M.P., et al., "A Survey of the Functional Splits Proposed for 5G Mobile Crosshaul Networks", IEEE Communications Surveys & Tutorials, vol. 21, No. 1, Feb. 21, 2019, XP011711824, 28 pages, pp. 146-172, DOI: 10.1109/COMST.2018.2868805.

Qualcomm CDMA Technologies: "ORAN WG4 Specification CUS.0-v07.01", ETSI Draft; MSG(21)000017R1, European Telecommunications Standards Institute (ETSI), 650, Route Des Lucioles, F-06921 Sophia-Antipolis Cedex, France, vol. TC MSG Mobile Standards Group, Nov. 22, 2021, XP014412029, pp. 1-320, 4.1 Architectural Split.

* cited by examiner

SERVICE LEVEL BASED OPERATION MODES OF RADIO UNITS

FIELD OF THE DISCLOSURE

Aspects of the present disclosure generally relate to wireless communication and to techniques and apparatuses for service level based operation modes of radio units.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

SUMMARY

Figure 1:
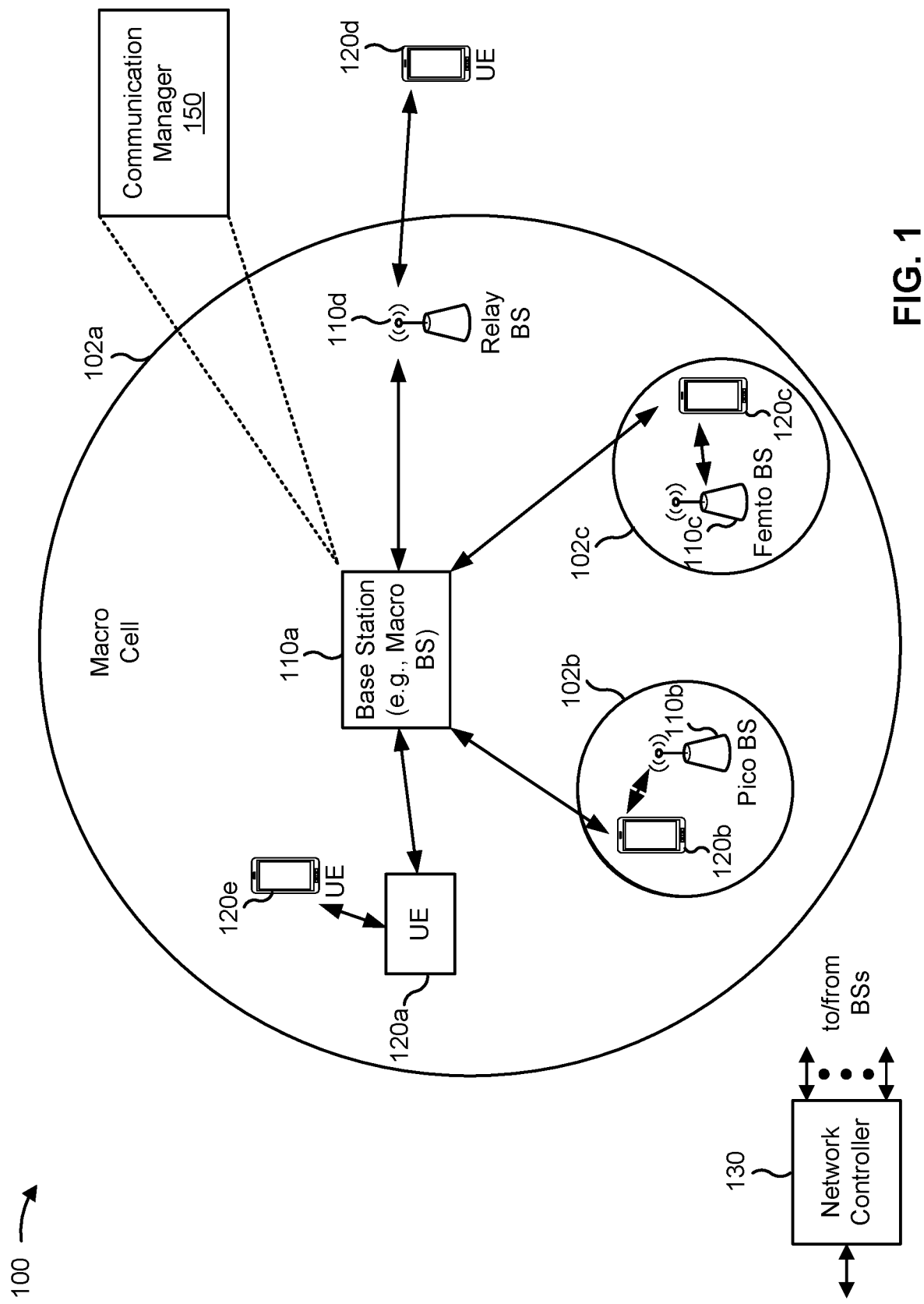
FIG. 1 is a diagram illustrating an example of a wireless network, in accordance with the present disclosure.

Some aspects described herein relate to a method of wireless communication performed by a radio unit (RU). The method may include receiving, from a distributed unit (DU), an indication of a service level based operation mode, from a set of multiple candidate service level based operation modes, to use for transmitting or receiving a front haul communication. The method may include transmitting or receiving the front haul communication having a level of layer 1 (L1) processing that is based at least in part on the service level based operation mode.

Some aspects described herein relate to a method of wireless communication performed by a DU. The method may include transmitting, to an RU, an indication of a service level based operation mode, from a set of multiple candidate service level based operation modes, to use for transmitting or receiving a front haul communication. The method may include transmitting or receiving the front haul communication having a level of L1 processing that is based at least in part on the service level based operation mode.

Some aspects described herein relate to an RU for wireless communication. The RU may include a memory and one or more processors coupled to the memory. The one or more processors may be configured to receive, from a DU, an indication of a service level based operation mode, from a set of multiple candidate service level based operation modes, to use for transmitting or receiving a front haul communication. The one or more processors may be configured to transmit or receive the front haul communication having a level of L1 processing that is based at least in part on the service level based operation mode.

Some aspects described herein relate to a DU for wireless communication. The DU may include a memory and one or more processors coupled to the memory. The one or more processors may be configured to transmit, to an RU, an indication of a service level based operation mode, from a set of multiple candidate service level based operation modes, to use for transmitting or receiving a front haul communication. The one or more processors may be configured to transmit or receive the front haul communication having a level of L1 processing that is based at least in part on the service level based operation mode.

Some aspects described herein relate to a non-transitory computer-readable medium that stores a set of instructions for wireless communication by an RU. The set of instructions, when executed by one or more processors of the RU, may cause the RU to receive, from a DU, an indication of a service level based operation mode, from a set of multiple candidate service level based operation modes, to use for transmitting or receiving a front haul communication. The set of instructions, when executed by one or more processors of the RU, may cause the RU to transmit or receive the front haul communication having a level of L1 processing that is based at least in part on the service level based operation mode.

Some aspects described herein relate to a non-transitory computer-readable medium that stores a set of instructions for wireless communication by a DU. The set of instructions, when executed by one or more processors of the DU, may cause the DU to transmit, to an RU, an indication of a service level based operation mode, from a set of multiple candidate service level based operation modes, to use for transmitting or receiving a front haul communication. The set of instructions, when executed by one or more processors of the DU, may cause the DU to transmit or receive the front haul communication having a level of L1 processing that is based at least in part on the service level based operation mode.

Some aspects described herein relate to an apparatus for wireless communication. The apparatus may include means for receiving, from a DU, an indication of a service level based operation mode, from a set of multiple candidate service level based operation modes, to use for transmitting or receiving a front haul communication. The apparatus may include means for transmitting or receiving the front haul communication having a level of L1 processing that is based at least in part on the service level based operation mode.

Some aspects described herein relate to an apparatus for wireless communication. The apparatus may include means for transmitting, to an RU, an indication of a service level based operation mode, from a set of multiple candidate service level based operation modes, to use for transmitting or receiving a front haul communication. The apparatus may include means for transmitting or receiving the front haul communication having a level of L1 processing that is based at least in part on the service level based operation mode.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peerto-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the an RU (e.g., of an O-RAN architecture) may include a communication manager 150. As described in more detail elsewhere herein, the communication manager 150 may receive, from a DU (e.g., of the O-RAN architecture), an indication of a service level based operation mode, from a set of multiple candidate service level based operation modes, to use for transmitting or receiving a front haul communication; and receive the front haul communication having a level of L1 processing that is based at least in part on the service level based operation mode. Additionally, or alternatively, the communication manager 150 may perform one or more other operations described herein.

In some aspects, the DU may include a communication manager 150. As described in more detail elsewhere herein, the communication manager 150 may transmit, to an RU, an indication of a service level based operation mode, from a set of multiple candidate service level based operation modes, to use for transmitting or receiving a front haul communication; and transmit or receive the front haul communication having a level of L1 processing that is based at least in part on the service level based operation mode. Additionally, or alternatively, the communication manager 150 may perform one or more other operations described herein.

As indicated above, FIG. 1 is provided as an example. Other examples may differ from what is described with regard to FIG. 1.

Figure 2:
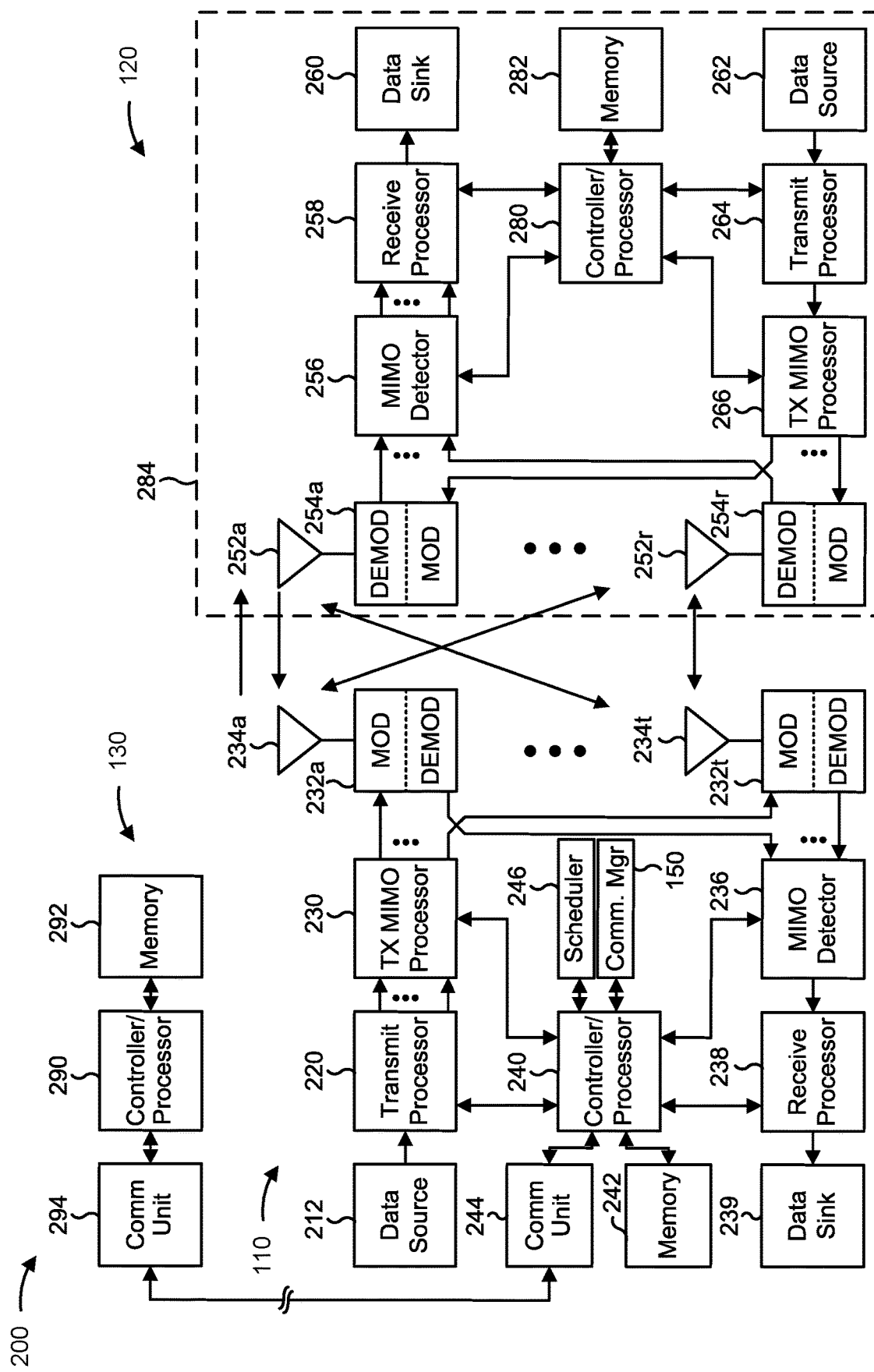
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 5-11).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 5-11).

The controller/processor 240 of the base station 110, the controller/processor 280 of the UE 120, and/or any other component(s) of FIG. 2 may perform one or more techniques associated with service level based operation modes of RUs, as described in more detail elsewhere herein. In some aspects, the DU and/or the RU described herein are the base station 110, are included in the base station 110, or include one or more components of the base station 110 shown in FIG. 2. For example, the controller/processor 240 of the base station 110, and/or any other component(s) of FIG. 2 may perform or direct operations of, for example, process 800 of FIG. 8, process 900 of FIG. 9, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 800 of FIG. 8, process 900 of FIG. 9, and/or other processes as described herein. In some examples, executing instructions may include running the instructions, converting the instructions, compiling the instructions, and/or interpreting the instructions, among other examples.

In some aspects, the RU includes means for receiving, from a DU, an indication of a service level based operation mode, from a set of multiple candidate service level based operation modes, to use for transmitting or receiving a front haul communication; and/or means for transmitting or receiving the front haul communication having a level of L1 processing that is based at least in part on the service level based operation mode. In some aspects, the means for the RU to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, the DU includes means for transmitting, to an RU, an indication of a service level based operation mode, from a set of multiple candidate service level based operation modes, to use for transmitting or receiving a front haul communication; and/or means for transmitting or receiving the front haul communication having a level of L1 processing that is based at least in part on the service level based operation mode. In some aspects, the means for the DU to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
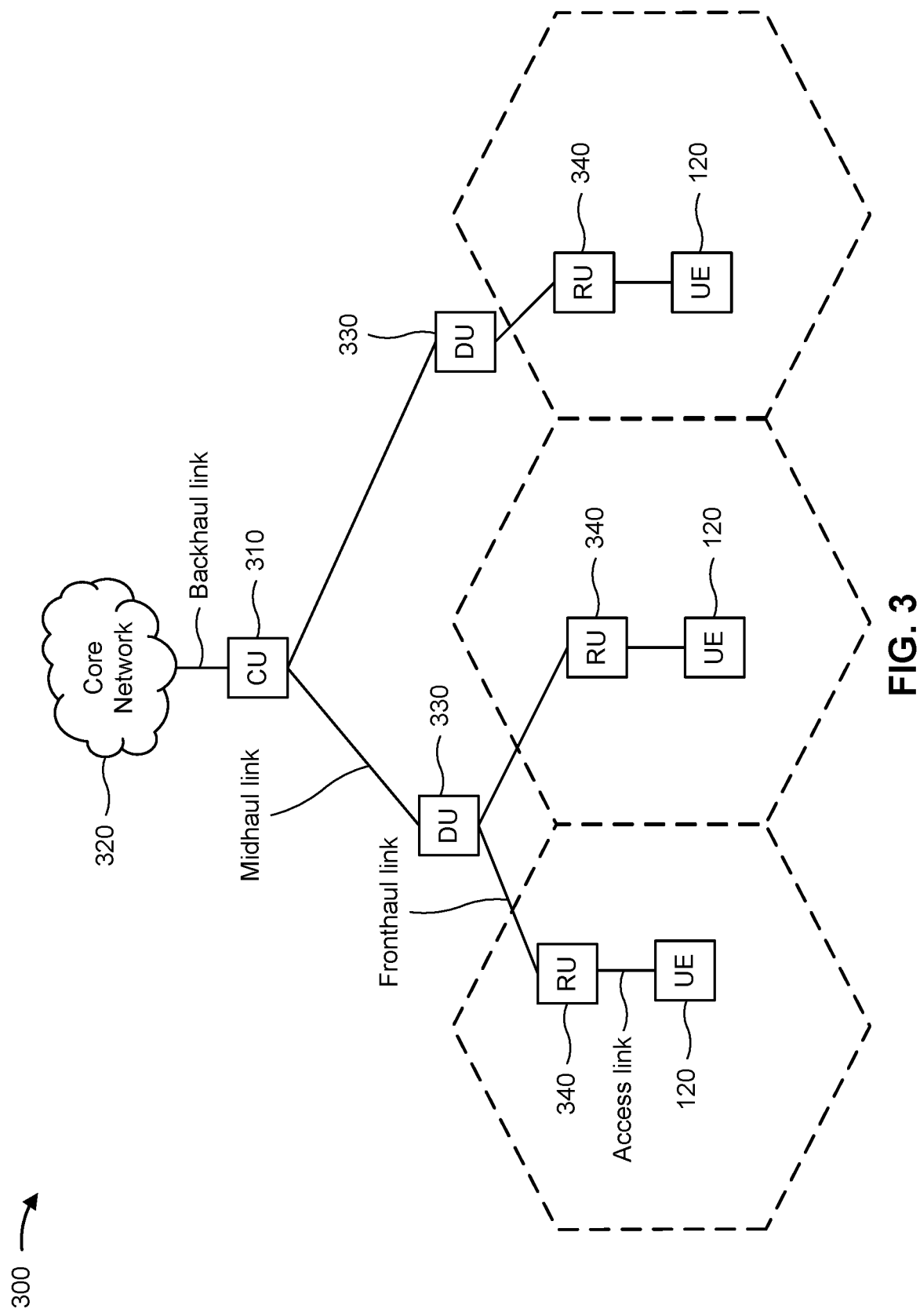
FIG. 3 is a diagram illustrating an example of an open radio access network (O-RAN) architecture, in accordance with the present disclosure.

FIG. 3 is a diagram illustrating an example 300 of an O-RAN architecture, in accordance with the present disclosure. As shown in FIG. 3, the O-RAN architecture may include a control unit (CU) 310 that communicates with a core network 320 via a backhaul link. Furthermore, the CU 310 may communicate with one or more DUs 330 via respective midhaul links. The DUs 330 may each communicate with one or more RUs 340 via respective fronthaul links, and the RUs 340 may each communicate with respective UEs 120 via radio frequency (RF) access links established within cells supported by the RUs 340. The DUs 330 and the RUs 340 may also be referred to as O-RAN DUs (O-DUs) 330 and O-RAN RUs (O-RUs) 340, respectively.

As shown in FIG. 3, three RUs may support three cells in which one or more UEs may access the core network 320 via a DU 330 and the CU 310. As further shown in FIG. 3, a single DU may support multiple RUs, each of which may support different cells. For example, a first DU 330 may be associated with a first RU 340 and a second DU 340 and a second DU 330 may be associated with a third RU 340.

In some aspects, the DUs 330 and the RUs 340 may be implemented according to a functional split architecture in which functionality of a base station 110 (e.g., an eNB or a gNB) is provided by a DU 330 and one or more RUs 340 that communicate over a fronthaul link. Accordingly, as described herein, a base station 110 may include a DU 330 and one or more RUs 340 that may be co-located or geographically distributed. In some aspects, the DU 330 and the associated RU(s) 340 may communicate via a fronthaul link to exchange real-time control plane information via a lower layer split (LLS) control plane (LLS-C) interface, to exchange non-real-time management information via an LLS management plane (LLS-M) interface, and/or to exchange user plane information via an LLS user plane (LLS-U) interface.

Accordingly, the DU 330 may correspond to a logical unit that includes one or more base station functions to control the operation of one or more RUs 340. For example, in some aspects, the DU 330 may host a radio link control (RLC) layer, a medium access control (MAC) layer, and one or more high physical (PHY) layers (e.g., forward error correction (FEC) encoding and decoding, scrambling, and/or modulation and demodulation) based at least in part on a lower layer functional split. Higher layer control functions, such as a packet data convergence protocol (PDCP), radio resource control (RRC), and/or service data adaptation protocol (SDAP), may be hosted by the CU 310. The RU(s) 340 controlled by a DU 330 may correspond to logical nodes that host RF processing functions and low-PHY layer functions (e.g., fast Fourier transform (FFT), inverse FFT (iFFT), digital beamforming, and/or physical random access channel (PRACH) extraction and filtering) based at least in part on the lower layer functional split. Accordingly, in an O-RAN architecture, the RU(s) 340 handle all over the air (OTA) communication with a UE 120, and real-time and non-real-time aspects of control and user plane communication with the RU(s) 340 are controlled by the corresponding DU 330, which enables the DU(s) 330 and the CU 310 to be implemented in a cloud-based RAN architecture.

In some aspects, the DUs may be configured to perform a first level of L1 (L1) processing (e.g., physical layer processing) and the RUs 340 may be configured to perform a second level of L1 processing. For example, L1 processing may be split between the DUs 330 and the RUs 340 according to a functional split configuration, such as those described in connection with FIG. 4.

As indicated above, FIG. 3 is provided as an example. Other examples may differ from what is described with regard to FIG. 3.

Figure 4:
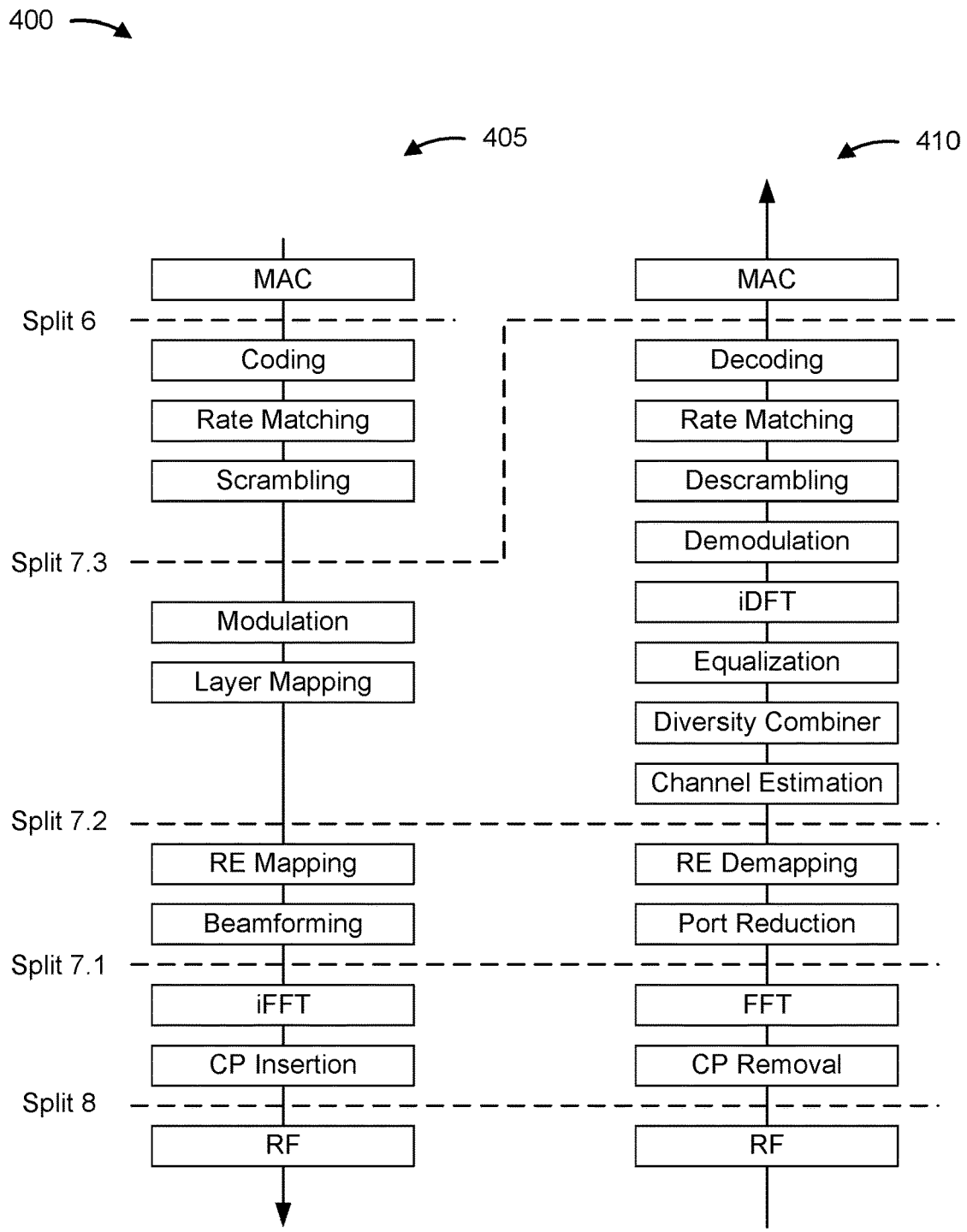
FIG. 4 is a diagram illustrating an example of functional splits that may be implemented in the O-RAN architecture, in accordance with the present disclosure.

FIG. 4 is a diagram illustrating an example 400 of functional splits that may be implemented in the O-RAN architecture, in accordance with the present disclosure.

A set 405 of L1 processes may be performed by a DU and/or an RU on downlink communications for transmission to a UE. The set 405 of L1 processes include receiving a payload for a downlink communication that is processed to a MAC layer (e.g., layer 2). The set 405 of L1 processes may include coding, rate matching, scrambling, modulation, layer mapping, resource element (RE) mapping, beamforming, performing an inverse Fast Fourier Transform (iFFT), and/or performing cyclic prefix (CP) insertion, among other examples. Once the set 405 of L1 processes are performed on the payload for the downlink communication, the payload may be transmitted via RF components of the RU.

A set 410 of L1 processes may be performed by a DU and/or an RU on uplink communications for transmission to a UE. The set 410 of L1 processes may include receiving an uplink communication as signal samples from RF components of the RU. The set 405 of L1 processes may include performing CP removal, performing a Fast Fourier Transform (FFT), performing port reduction, RE demapping, performing channel estimation, applying a diversity combiner, performing equalization, performing an inverse Discrete Fourier Transform (iDFT) demodulating, descrambling, rate matching, and/or decoding, among other examples. Once the set 410 of L1 processes are performed on the payload for the uplink communication, the payload may be further processed in a MAC layer (e.g., layer 2) at the DU and/or a CU.

In centralized RAN (CRAN) and/or virtual RAN deployments, a centralized entity (e.g., the DU) may perform baseband processing of non-co-located RUs. A fronthaul link may be defined to carry traffic between the DU and associated RUs (the non-co-located RUs). In these deployments, the DU may be configured with processing resources to perform L1 processing. The processing resources in the DU may be configured to allow measures of base-band pooling and/or to offer flexibility in dynamic resource management of the processing resources.

In some RANs, L1 processing may be divided between DUs and RUs in functional splits. For example, Split 6 defines that all of L1 is processed in the RU (e.g., all processes below the Split 6 line of FIG. 4), which is efficient in terms of fronthaul capacity but reduces deployment flexibility in central processing. The reduced deployment flexibility in central processing may reduce efficiencies related to base-band pooling. Split 8 defines that all of L1 is processed in the DU (e.g., all processes above the Split 8 line of FIG. 4), which increases deployment flexibility in central processing, but is inefficient in terms of fronthaul capacity.

Different types of Split 7, in which one or more L1 processing operations are performed by the DU (e.g., all processes above the Split 7.3, Split 7.2, or Split 7.1 lines of FIG. 4), allow increased flexibility of base-band pooling. However, the different types of Split 7 require relatively high demanding fronthaul capacity requirements when compared to Split 6. As shown in FIG. 4, for Split 7.3, the DU performs coding, rate matching, and scrambling of a payload for transmission to the UE before providing a backhaul communication to the RU and the RU performs modulation, layer mapping, RE mapping, beamforming, iFFT, and CP insertion before transmitting a communication. Additionally, or alternatively, the RU performs CP removal, FFT, port reduction, RE demapping, channel estimation, diversity combining, equalization, iDFT, demodulation, descrambling, rate matching and decoding before providing the backhaul communication to the DU. For Split 7.2, the DU performs coding, rate matching, scrambling, modulation, and layer mapping of a payload for transmission to the UE before providing a backhaul communication to the RU and the RU performs RE mapping, beamforming, iFFT, and CP insertion before transmitting a communication. Additionally, or alternatively, the RU performs CP removal, FFT, port reduction, and RE demapping before providing the backhaul communication to the DU, and the DU performs channel estimation, diversity combining, equalization, iDFT, demodulation, descrambling, rate matching and decoding. For Split 7.1, the DU performs coding, rate matching, scrambling, modulation, layer mapping, RE mapping, and beamforming of a payload for transmission to the UE before providing a backhaul communication to the RU and the RU performs iFFT and CP insertion before transmitting a communication. Additionally, or alternatively, the RU performs CP removal and before providing the backhaul communication to the DU, and the DU performs FFT port reduction, RE demapping, channel estimation, diversity combining, equalization, iDFT, demodulation, descrambling, rate matching and decoding.

When implementing base-band pooling, it is expected that a DU processing budget may be under-provisioned, relying on the fact that not all RUs are required to provide service at a maximum bandwidth and rate all at the same time. Such an assumption may allow operators to save significant capital expenditure as less hardware may be required to provide services in an area (e.g., in one or more cells).

To support base-band pooling, the DU may be configured to support a relatively large number of RUs that are not overly populated (e.g., with connected UEs) and that are not providing service at a high rate (e.g., a high data rate). In other words, some RUs may operate in a low service mode. Additionally, or alternatively, the DU may be configured to support routing and/or dedicating data processing resources to the RUs for data service when needed (e.g., on demand). However, flexibility in routing and/or dedicating data processing resources may be limited based at least in part on a logical split of L1 processing being hardened (e.g., non-flexible and/or semi-statically configured) based at least in part on an explicit functionality that is expected by the DU and associated RUs. In this way, a DU that supports a large number of RUs, even if deprovisioned, imposes linear complexity for DU implementation based at least in part on buffers and signal processing associated with RUs in low service mode.

A low service mode for RUs may be associated with an RU not being expected to provide peak rate services and/or the RU being expected to provide services in an under-utilized scenario. For example, the RU may be configured as a physical random access channel (PRACH) receiver with minimal dimensioning, a physical uplink shared channel (PUCCH) receiver with minimal dimensioning, a physical uplink shared channel (PUSCH) receiver with minimal dimensioning, a physical downlink control channel (PDCCH) transmitter with minimal dimensioning, and/or a physical downlink shared channel (PDSCH) transmitter with minimal dimensioning, among other examples. Additionally, or alternatively, the RU may be configured to perform services associated with under-utilized scenario support of radio resource management (RRM) procedures (e.g., initial bandwidth part configuration, an initial control resource set (e.g., CORESET0), and/or system information blocks (SIGs), among other examples). In some configurations, the RU may be configured, in a low service mode, to perform synchronization signal block (SSB) transmission, PRACH reception, PDSCH and PUSCH RACH procedure support (e.g., random access or temporary cell Radio Network Temporary Identity (RNTI)), broadcast SIBs signaling (e.g., system information-RNTI) in an initial bandwidth part, and/or PDCCH random access channel (RACH) procedure support (e.g., downlink control information (DCI) messages 0_0, 1_0, CORESET0, among other examples), among other examples.

In some aspects described herein, a DU and one or more RUs may operate with dynamic infra-functional splits (e.g., dynamic configurations of the functional splits shown in FIG. 4). In some aspects, one or more DUs and the RUs may operate with different splits for different physical channels and/or for different service loads of the RUs. The RUs may be configured with L1 processing capabilities that support a low service mode (e.g., low rates). When in the low service mode, an RU may perform full processing and a fronthaul interface may carry messages such as a RACH indication, a PUCCH indication, a PDCCH request, and/or a PDSCH request, among other examples. When in a standard service mode (e.g., a regular service mode), the RU may transmit a form of signal samples to the DU and the DU may perform L1 processing (e.g., for each channel, for uplink communications, and for downlink communications, among other examples). In some aspects, additional service modes may be configured in which different amounts of L1 processing are performed by the RU.

In order to enable dynamic infra-functional splits, a new messaging may be added to a fronthaul specification (e.g., an O-RAN specification) to allow for messaging to indicate a service mode to the RU. Additionally, or alternatively, new signaling messages may be used to indicate that the RU is to switch from one mode to another. Further, a capability message and/or a capability flag may be configured to indicate that the RU supports the dynamic infra-functional splits (dynamic splits). In some aspects, the DU and the RU may perform a capability negotiation to determine and configure a usage of a dynamic infra-functional split of L1 processes. In some aspects, the dynamic infra-functional split may be reconfigured (e.g., via an indication from the base station, based at least in part on a configured trigger condition, or via a capability negotiation, among other examples) based at least in part on a changed condition. For example, the dynamic infra-functional split may be reconfigured based at least in part on a number of RUs per DU.

In this way, the DU may support base-band pooling for an increased number of RUs with reduced computing resources at the DU and/or with reduced fronthaul bandwidth support based at least in part on the DU shifting processing to the RUs when efficient to support low-rate communications.

Figure 5:
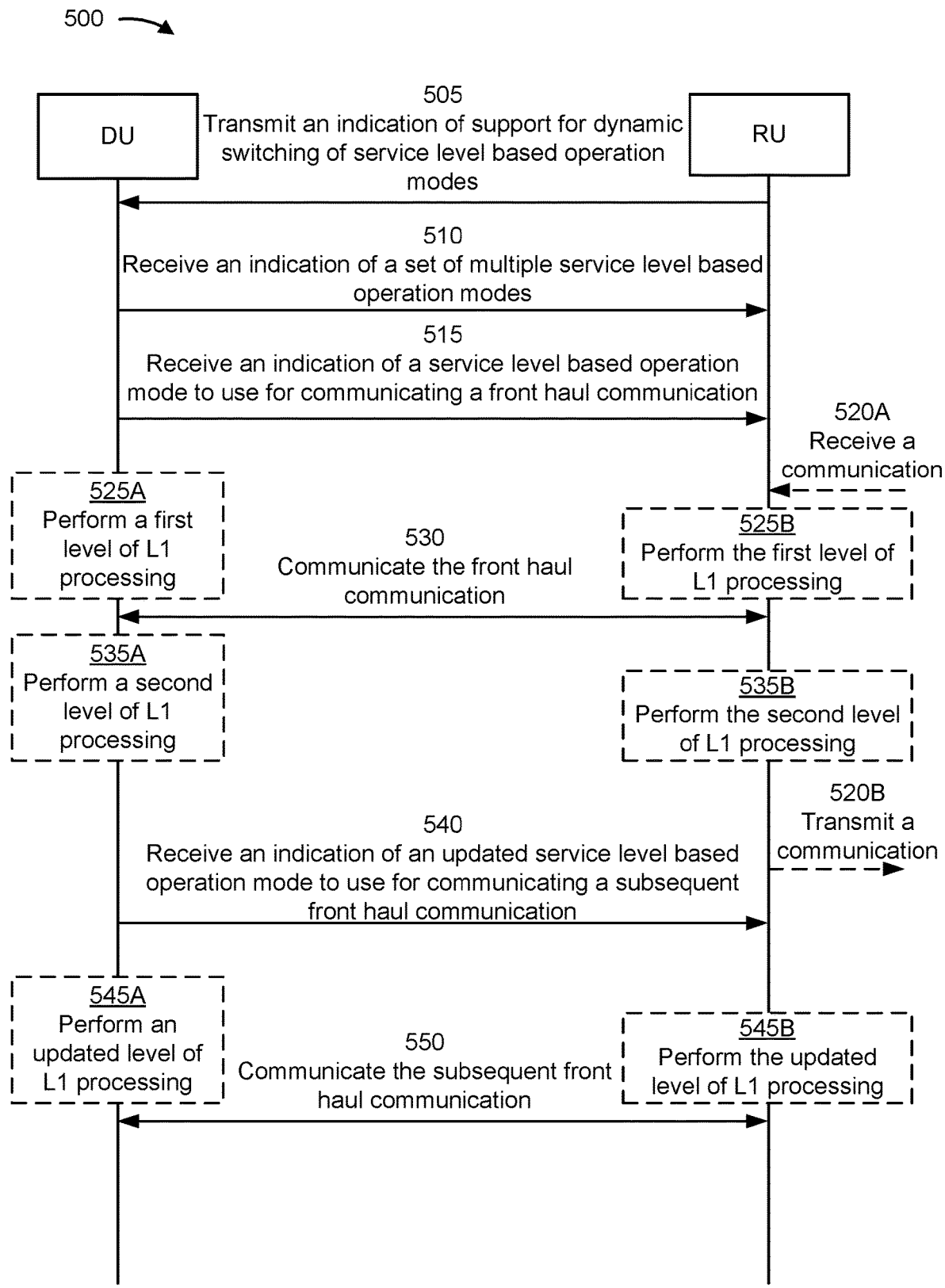
FIGS. 5-7 are diagrams illustrating examples associated with service level based operation modes of radio units, in accordance with the present disclosure.

FIG. 5 is a diagram illustrating an example 500 associated with service level based operation modes of RUs, in accordance with the present disclosure. As shown in FIG. 5, a DU (e.g., DU 330) may communicate with an RU (e.g., RU 340) via a front haul link. In some aspects, the DU and the RU may be part of a RAN (e.g., an O-RAN, a CRAN, and/or a virtual RAN).

As shown by reference number 505, the RU may transmit, and the DU may receive, an indication of support for dynamic switching of service level based operation modes. In some aspects, the RU may transmit the indication of support during a configuration process. In some aspects, the RU may transmit the indication of support based at least in part on a request, from the DU, for the indication of support. In some aspects, the indication of support may indicate a number of different service level based operation modes that the RU supports for selection by the DU.

As shown by reference number 510, the RU may receive, and the DU may transmit, an indication of a set of multiple service level based operation modes. In some aspects, the set of multiple service level based operation modes may include service level based operation modes (a low service mode and a standard service mode). Additionally, or alternatively, the set of multiple service level based operation modes may include additional service level based operation modes (e.g., a mid-service mode or a no-service mode, among other examples). The service level based operation modes may be associated with different levels of L1 processing being performed by the RU or the DU (e.g., Split 6, Split 7.1, Split 7.2, Split 7.3, or Split 8 described in connection with FIG. 4, among other examples).

The service level based operation modes may be associated with a number, type, and/or volume of services and/or communications, among other examples, supported in a cell provided by the RU. For example, an RU in a low service level operation mode may not be expected to provide peak service rates services and/or may be expected to provide services in an under-utilized scenario. For example, the RU in the low service level operation mode may be expected to provide a PRACH receiver with minimal dimensioning, PUCCH receiver with minimal dimensioning, a PUSCH receiver with minimal dimensioning, a PDCCH transmitter with minimal dimensioning, and/or a PDSCH transmitter with relatively small dimensioning (minimal and/or small relative to a standard service level operation mode or a high service level operation mode). The RU in the low service level operation mode may operate in an under-utilized scenario for support of RRM procedures (e.g., an initial bandwidth part configuration, an initial CORESET, and/or SIBs, among other examples). In some configurations, the RU may be configured, in a low service mode, to perform SSB transmission, PRACH reception, PDSCH and PUSCH RACH procedure support (e.g., random access or temporary cell RNTI), broadcast SIBs signaling (e.g., system information-RNTI) in an initial bandwidth part, and/or PDCCH RACH procedure support (e.g., DCI messages 0_0, 1_0, CORESET0, among other examples), among other examples.

In some aspects, a first candidate service level based operation mode (e.g., a standard service mode) may be associated with providing services to one or more UEs having an amount of traffic that satisfies a traffic threshold and a second candidate service level based operation mode (e.g., a low service mode) may be associated with providing services to one or more UEs having an amount of traffic that fails to satisfy the traffic threshold.

In some aspects, a first candidate service level based operation mode may be associated with providing services to one or more UEs having traffic associated with a first set of traffic types that have a complexity that satisfies a complexity threshold (e.g., requiring at least a threshold amount of processing resources) and a second candidate service level based operation mode may be associated with providing services to one or more UEs having traffic associated with a second set of traffic types having complexity that fails to satisfy the complexity threshold (e.g., requiring less than the threshold amount of processing resources). For example, complexity may be based at least in part on a modulation scheme or coding rate used for traffic, where higher modulation orders (e.g., having a relatively high number of constellation points) or coding rates may increase complexity for L1 processing associated with demodulation and decoding. In some aspects, a PUCCH communication may have relatively low complexity based at least in part on having a relatively low modulation order and coding rate, where a PUSCH communication may have a relatively high complexity based at least in part on having a relatively high modulation order and coding rate.

In some aspects, a first candidate service level based operation mode may be associated with providing services to one or more UEs via a first channel type of a first set of channel types (e.g., with the first set of channel types being associated with the first candidate service level based operation mode) and a second candidate service level based operation mode may be associated with providing services to one or more UEs via a second channel type of a second set of channel types (e.g., with the second set of channel types being associated with the second candidate service level based operation mode). In some aspects, the channel types may include a PUSCH, a PUCCH, a PDSCH, a PDCCH, or a PRACH. In some aspects, sets of channel type may be based at least in part on a communication direction (e.g., uplink or downlink) or payload type (e.g., data channel or control channel, among other examples), among other examples.

In some aspects, a first candidate service level based operation mode may be associated with performing a first amount of L1 processing based at least in part on the first candidate service level based operation mode being a low service mode (e.g., a selected service mode for low-complexity and/or low-rate service) and a second candidate service level based operation mode may be associated with performing a second amount of L1 processing, that is greater than the first amount of L1 processing, based at least in part on the second candidate service level based operation mode being a high service mode. For example, the first candidate service level based operation mode may be associated with a first level of L1 processing performed by the RU or the DU, such as Split 6, Split 7.1, Split 7.2, Split 7.3, or Split 8 described in connection with FIG. 4, among other examples. The second candidate service level based operation mode may be associated with a second level of L1 processing performed by the RU or the DU, such as a different one of Split 6, Split 7.1, Split 7.2, Split 7.3, or Split 8 described in connection with FIG. 4, among other examples.

In some aspects, the L1 processing includes physical layer processing, such as antenna demapping, resources demapping, signal decoding (e.g., MIMO decoding, single-input multiple-output decoding, or single-input single-output decoding, among other examples), data demodulation, and/or channel decoding, among other examples.

In some aspects, a first candidate service level based operation mode of the set of multiple candidate service level based operation modes is associated with the front haul communication having an indication of a message payload (e.g., a demodulated and/or decoded message) and a second candidate service level based operation mode of the set of multiple candidate service level based operation modes is associated with the front haul communication having an indication of a wave form associated with the message (e.g., a modulated and/or encoded message). In some aspects, the indication may include request (e.g., an indication of the message) or a full payload of the message, among other examples.

As shown by reference number 515, the RU may receive, and the DU may transmit, an indication of a service level based operation mode to use for communicating a front haul communication. For example, the RU may receive the indication of the service level based operation mode as a selection from the set of multiple service level based operation modes described in connection with reference number 510.

In some aspects, the DU may transmit a first indication of a service level based operation mode for the RU to use for communicating a front haul communication and the DU may transmit a second indication of second service level based operation mode for an additional RU to use for communicating an additional front haul communication. For example, the DU may indicate different service level based operation modes to different RUs that are associated with the DU.

As shown by reference number 520A, the RU may receive a communication (e.g., from a UE). In some aspects, the RU may receive the communication from the UE in an uplink communication. The RU may be configured to forward the communication (e.g., with or without L1 processing) to the DU as a front haul communication. The communication may be associated with a PUSCH, a PUCCH, or a PRACH, among other examples.

As shown by reference number 525A, the DU may perform a first level of L1 processing. For example, for a downlink communication, the DU may perform an amount of L1 processing as indicated by the service level based operation mode. Based at least in part on performing the first level of L1 processing, the DU may generate a front haul communication to transmit to the RU (e.g., for transmitting to a UE).

As shown by reference number 525B, the RU may perform the first level of L1 processing. For example, for an uplink communication, the RU may perform an amount of L1 processing as indicated by the service level based operation mode. Based at least in part on performing the first level of L1 processing, the RU may generate a front haul communication to transmit to the DU.

As shown by reference number 530, the RU and the DU may communicate the front haul communication (e.g., having the level of L1 processing that is based at least in part on the service level based operation mode). For example, for an uplink communication, the RU may transmit the front haul communication to the DU. Additionally, or alternatively, for a downlink communication, the DU may transmit the front haul communication to the RU.

As shown by reference number 535A, the DU may perform a second level of L1 processing. The second level of L1 processing may be based at least in part on the first level of L1 processing performed by the UE (e.g., for an uplink communication). In some aspects, the DU may perform L1 processing that is complementary to the first level of L1 processing performed by the RU. For example, the RU may perform lower level L1 processing or no L1 processing and the DU may perform upper level L1 processing or all L1 processing. Alternatively, the RU may perform all lower level L1 processing and the DU may perform no L1 processing.

As shown by reference number 535B, the RU may perform the second level of L1 processing. The second level of L1 processing may be based at least in part on the first level of L1 processing performed by the DU (e.g., for a downlink communication). In some aspects, the RU may perform the first level of L1 processing that is complementary to the first level of L1 processing performed by the DU. For example, the RU may perform lower level L1 processing or no L1 processing and the DU may perform upper level L1 processing or all L1 processing. Alternatively, the RU may perform all lower level L1 processing and the DU may perform no L1 processing.

As shown by reference number 520B, the RU may transmit a communication (e.g., to a UE). In a downlink communication, the DU may perform the first level of L1 processing on a payload to generate a front haul communication, the RU may perform the second level of L1 processing (e.g., no L1 processing, one or more processes of L1 processing, or all of L1 processing), and the RU may transmit the communication that is based at least in part on the front haul communication.

As shown by reference number 540, the RU may receive, and the DU may transmit, an indication of an updated service level based operation mode to use for communicating a subsequent front haul communication. For example, the RU may receive the indication of the updated service level based operation mode as an indication to change service level based operation modes from a previous front haul communication.

As shown by reference number 545A, the DU may perform an updated first level of L1 processing. For example, for a downlink communication, the DU may perform an amount of L1 processing as indicated by the updated service level based operation mode. Based at least in part on performing the updated first level of L1 processing, the DU may generate a subsequent front haul communication to transmit to the RU (e.g., for transmitting to a UE).

As shown by reference number 525B, the RU may perform the updated first level of L1 processing. For example, for an uplink communication, the RU may perform an amount of L1 processing as indicated by the updated service level based operation mode. Based at least in part on performing the updated first level of L1 processing, the RU may generate the subsequent front haul communication to transmit to the DU.

As shown by reference number 540, the RU and the DU may communicate the subsequent front haul communication. For example, in an uplink communication, the RU may transmit the subsequent front haul communication to the DU. Additionally, or alternatively, in a downlink communication, the DU may transmit the subsequent front haul communication to the RU.

Based at least in part on the DU dynamically configuring the RU based at least in part on traffic parameters, the DU may support base-band pooling for an increased number of RUs with reduced computing resources at the DU and/or with reduced fronthaul bandwidth support based at least in part on the DU shifting processing to the RUs when efficient to support low-rate communications.

As indicated above, FIG. 5 is provided as an example. Other examples may differ from what is described with regard to FIG. 5.

Figure 6:
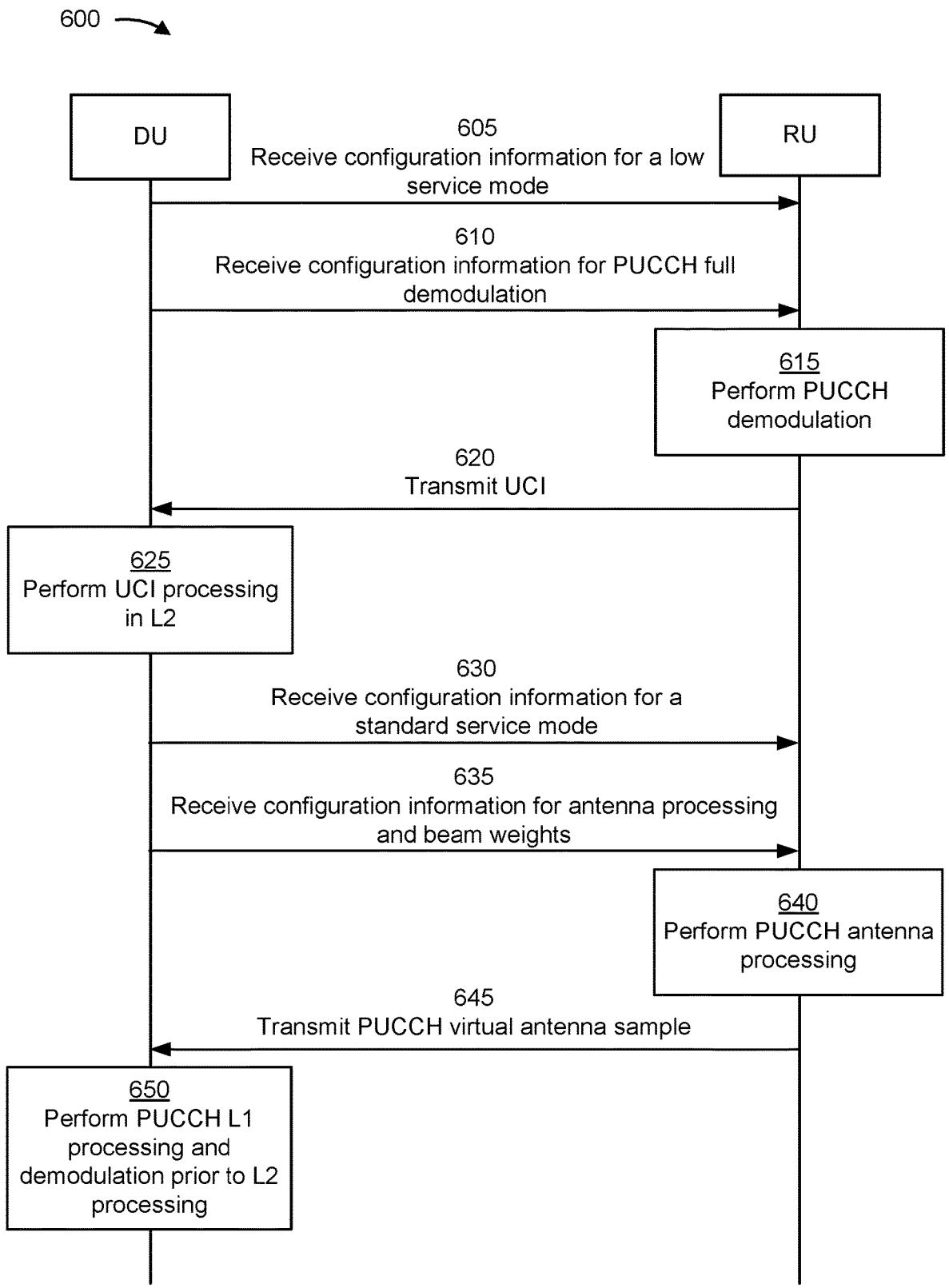

FIG. 6 is a diagram illustrating an example 600 associated with service level based operation modes of RUs, in accordance with the present disclosure. As shown in FIG. 6, a DU (e.g., DU 330) may communicate with an RU (e.g., RU 340) via a front haul link. In some aspects, the DU and the RU may be part of a RAN (e.g., an O-RAN, a CRAN, and/or a virtual RAN).

As shown by reference number 605, the RU may receive, and the DU may transmit, configuration information for a low service mode. For example, the DU may configure the RU for the low service mode (e.g., a service level based operation mode having low-rate and/or low complexity traffic).

As shown by reference number 610, the RU may receive, and the DU may transmit, configuration information for PUCCH full demodulation. For example, the DU may indicate one or more parameters (e.g., a modulation order) for demodulating a PUCCH communication.

As shown by reference number 615, the RU may perform PUCCH demodulation. For example, the RU may receive an uplink communication from a UE and demodulate the uplink communication based at least in part on the configuration information for PUCCH full demodulation.

As shown by reference number 620, the RU may transmit, and the DU may receive, uplink control information (UCI) based at least in part on demodulating the PUCCH. In some aspects, the UCI may be a demodulated communication and/or may have one or more additional L1 processes performed before transmission to the DU.

As shown by reference number 625, the DU may perform UCI processing in L2. For example, the DU may perform MAC layer processing and/or RRC layer processing, among other examples.

As shown by reference number 630, the RU may receive, and the DU may transmit, configuration information for a standard service mode. For example, the DU may configure the RU for the standard service mode (e.g., a service level based operation mode having standard rate and/or complexity traffic).

As shown by reference number 635, the RU may receive, and the DU may transmit, configuration information for PUCCH antenna processing and beam weights. For example, the DU may indicate one or more parameters (e.g., a modulation order) for antenna processing and/or applying beam weights.

As shown by reference number 640, the RU may perform PUCCH processing. For example, the RU may receive an uplink communication from a UE and perform a first level of L1 processing (e.g., antenna processing and/or applying beam weights) on the uplink communication based at least in part on the configuration information for PUCCH antenna processing and beam weights.

As shown by reference number 645, the RU may transmit, and the DU may receive, one or more PUCCH virtual antenna samples based at least in part on performing the first level of L1 processing.

As shown by reference number 650, the DU may perform PUCCH L1 processing and demodulation prior to performing L2 processing on the one or more PUCCH virtual antenna samples.

As indicated above, FIG. 6 is provided as an example. Other examples may differ from what is described with regard to FIG. 6.

Figure 7:
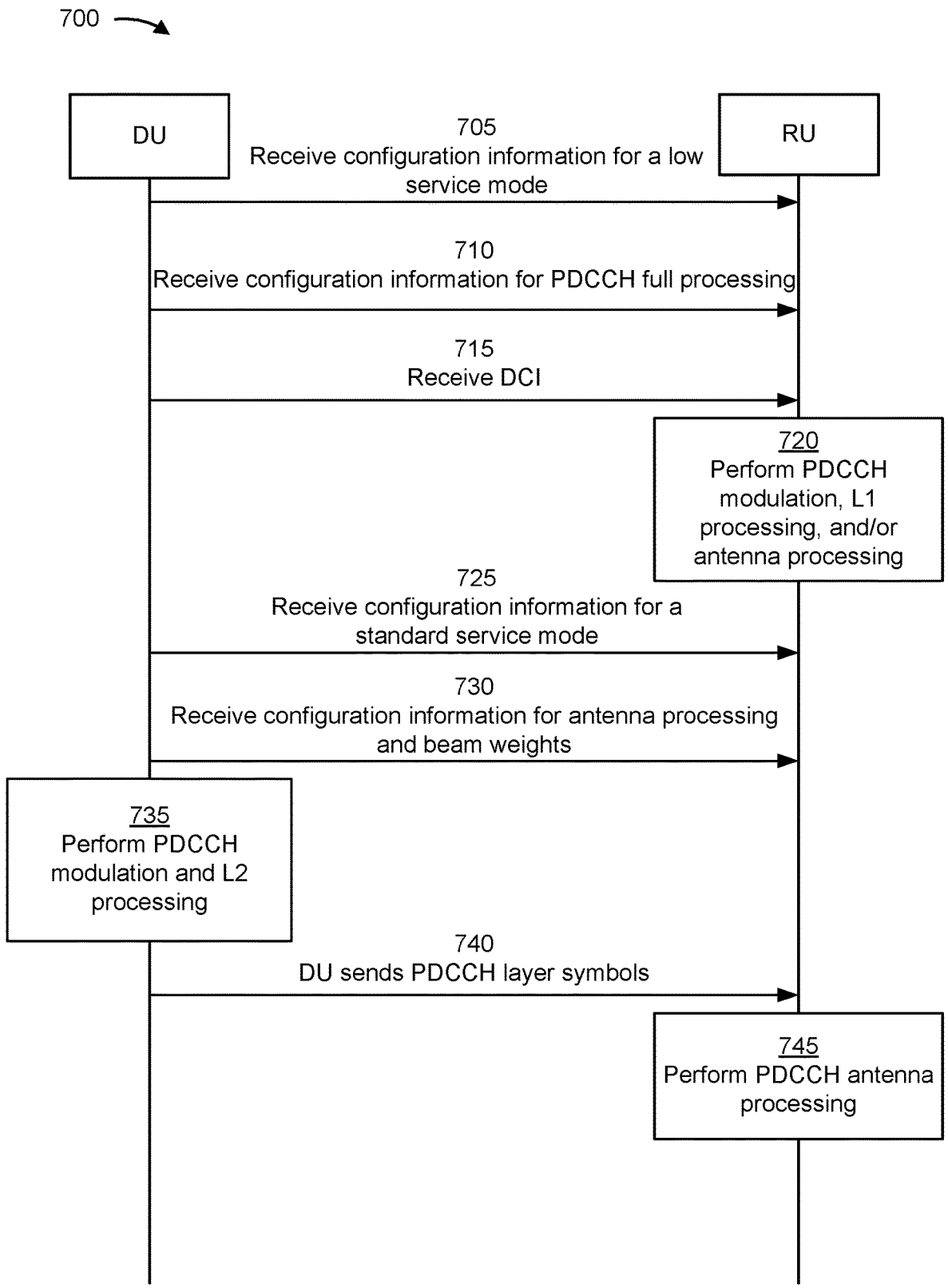

FIG. 7 is a diagram illustrating an example 700 associated with service level based operation modes of RUs, in accordance with the present disclosure. As shown in FIG. 7, a DU (e.g., DU 330) may communicate with an RU (e.g., RU 340) via a front haul link. In some aspects, the DU and the RU may be part of a RAN (e.g., an O-RAN, a CRAN, and/or a virtual RAN).

As shown by reference number 705, the RU may receive, and the DU may transmit, configuration information for a low service mode. For example, the DU may configure the RU for the low service mode (e.g., a service level based operation mode having low-rate and/or complexity traffic).

As shown by reference number 710, the RU may receive, and the DU may transmit, configuration information for PDCCH full processing (e.g., L1 processing). For example, the DU may indicate one or more parameters (e.g., a modulation order) for modulating a PDCCH communication.

As shown by reference number 715, the RU may receive, and the DU may transmit, DCI based at least in part on the RU being configured to perform PDCCH full processing. In some aspects, the DCI may be processed with L2 processing before transmission to the RU for L1 processing.

As shown by reference number 720, the RU may perform PDCCH modulation, L1 processing, and/or antenna processing. For example, the RU may generate waveforms for transmission via an RF link to a UE.

As shown by reference number 725, the RU may receive, and the DU may transmit, configuration information for a standard service mode. For example, the DU may configure the RU for the standard service mode (e.g., a service level based operation mode having standard rate and/or complexity traffic).

As shown by reference number 730, the RU may receive, and the DU may transmit, configuration information for antenna processing and beam weights. For example, the DU may indicate one or more parameters (e.g., a modulation order) for PDCCH antenna processing and/or applying beam weights. In some aspects, the RU may not be configured, when in the standard service mode, to perform PDCCH modulation and/or L1 processing.

As shown by reference number 735, the DU may perform PDCCH processing, modulation, and L2 processing. For example, the DU may generate a message that the RU may apply to antenna elements of the RU without first performing L1 processing.

As shown by reference number 740, the RU may receive, and the DU may transmit, one or more PDCCH layer symbols based at least in part on performing a first level of L1 processing.

As shown by reference number 745, the RU may perform PDCCH antenna processing for transmission via one or more antenna elements of the RU.

As indicated above, FIG. 7 is provided as an example. Other examples may differ from what is described with regard to FIG. 7.

Figure 8:
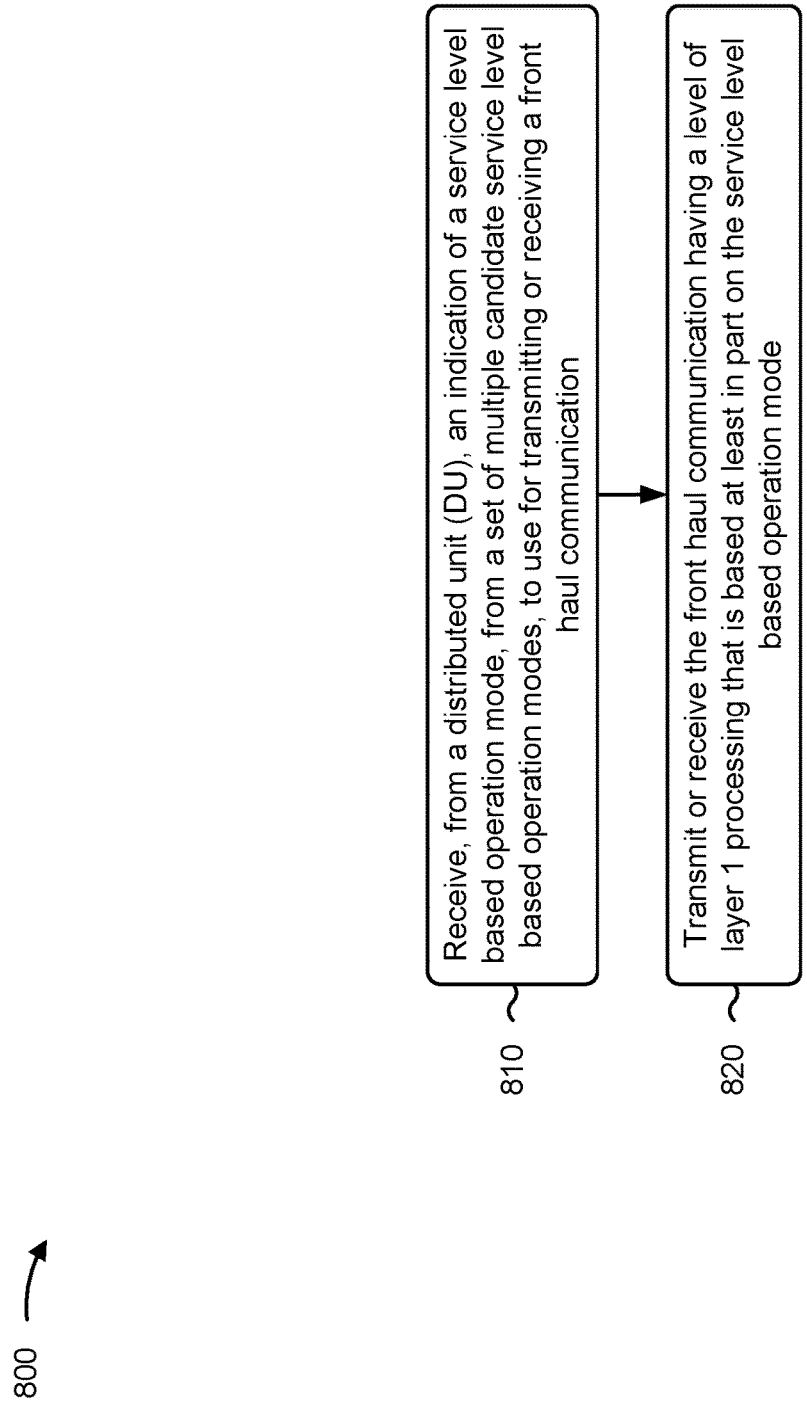
FIGS. 8 and 9 are diagrams illustrating example processes associated with service level based operation modes of radio units, in accordance with the present disclosure.

FIG. 8 is a diagram illustrating an example process 800 performed, for example, by an RU, in accordance with the present disclosure. Example process 800 is an example where the RU (e.g., RU 340) performs operations associated with service level based operation modes of RUs.

As shown in FIG. 8, in some aspects, process 800 may include receiving, from a DU, an indication of a service level based operation mode, from a set of multiple candidate service level based operation modes, to use for transmitting or receiving a front haul communication (block 810). For example, the RU (e.g., using communication manager 150 and/or reception component 1002, depicted in FIG. 10) may receive, from a DU, an indication of a service level based operation mode, from a set of multiple candidate service level based operation modes, to use for transmitting or receiving a front haul communication, as described above.

As further shown in FIG. 8, in some aspects, process 800 may include transmitting or receiving the front haul communication having a level of L1 processing that is based at least in part on the service level based operation mode (block 820). For example, the RU (e.g., using communication manager 150 and/or transmission component 1004, depicted in FIG. 10) may transmit or receive the front haul communication having a level of L1 processing that is based at least in part on the service level based operation mode, as described above.

Process 800 may include additional aspects, such as any single aspect or any combination of aspects described below and/or in connection with one or more other processes described elsewhere herein.

In a first aspect, a first candidate service level based operation mode of the set of multiple candidate service level based operation modes is associated with providing services to one or more UEs having an amount of traffic that satisfies a traffic threshold, and a second candidate service level based operation mode of the set of multiple candidate service level based operation modes is associated with providing services to one or more UEs having an amount of traffic that fails to satisfy the traffic threshold.

In a second aspect, alone or in combination with the first aspect, a first candidate service level based operation mode of the set of multiple candidate service level based operation modes is associated with providing services to one or more UEs having traffic associated with a first set of traffic types having complexity that satisfies a complexity threshold, and a second candidate service level based operation mode of the set of multiple candidate service level based operation modes is associated with providing services to one or more UEs having traffic associated with a second set of traffic types having complexity that fails to satisfy the complexity threshold.

In a third aspect, alone or in combination with one or more of the first and second aspects, a first candidate service level based operation mode of the set of multiple candidate service level based operation modes is associated with providing services to one or more UEs via a first channel type of a first set of channel types, and a second candidate service level based operation mode of the set of multiple candidate service level based operation modes is associated with providing services to one or more UEs via a second channel type of a second set of channel types.

In a fourth aspect, alone or in combination with one or more of the first through third aspects, a first candidate service level based operation mode of the set of multiple candidate service level based operation modes is associated with performing a first amount of L1 processing based at least in part on the first candidate service level based operation mode being a low service mode, and a second candidate service level based operation mode of the set of multiple candidate service level based operation modes is associated with performing a second amount of L1 processing, that is greater than the first amount of L1 processing, based at least in part on the second candidate service level based operation mode being a high service mode.

In a fifth aspect, alone or in combination with one or more of the first through fourth aspects, a first candidate service level based operation mode of the set of multiple candidate service level based operation modes is associated with the front haul communication having an indication of a message payload, and a second candidate service level based operation mode of the set of multiple candidate service level based operation modes is associated with the front haul communication having an indication of a wave form associated with the message payload.

In a sixth aspect, alone or in combination with one or more of the first through fifth aspects, process 800 includes transmitting, to the DU, an indication of support for dynamic switching of service level based operation modes.

In a seventh aspect, alone or in combination with one or more of the first through sixth aspects, process 800 includes transmitting to a UE, or receiving from the UE, a communication associated with the front haul communication.

In an eighth aspect, alone or in combination with one or more of the first through seventh aspects, transmitting or receiving the front haul communication comprises performing the level of L1 processing of the communication received from the UE, and transmitting an indication of a payload of the communication received from the UE or an indication of a sample of received signaling associated with the communication received from the UE based at least in part on the service level based operation mode.

In a ninth aspect, alone or in combination with one or more of the first through eighth aspects, transmitting or receiving the front haul communication comprises performing additional L1 processing of the front haul communication, the additional L1 processing based at least in part on the level of L1 processing performed by the DU, and transmitting a communication, associated with the front haul communication, to the UE after performing the additional L1 processing.

In a tenth aspect, alone or in combination with one or more of the first through ninth aspects, process 800 includes receiving, from the DU, an indication of an updated service level based operation mode, from the set of multiple candidate service level based operation modes, to use for transmitting or receiving a subsequent front haul communication, and transmitting or receiving the subsequent front haul communication having an updated level of L1 processing that is based at least in part on the updated service level based operation mode.

In an eleventh aspect, alone or in combination with one or more of the first through tenth aspects, an additional RU associated with the DU is configured to use a different service level based operation mode that is different from the service level based operation mode indicated for the RU.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
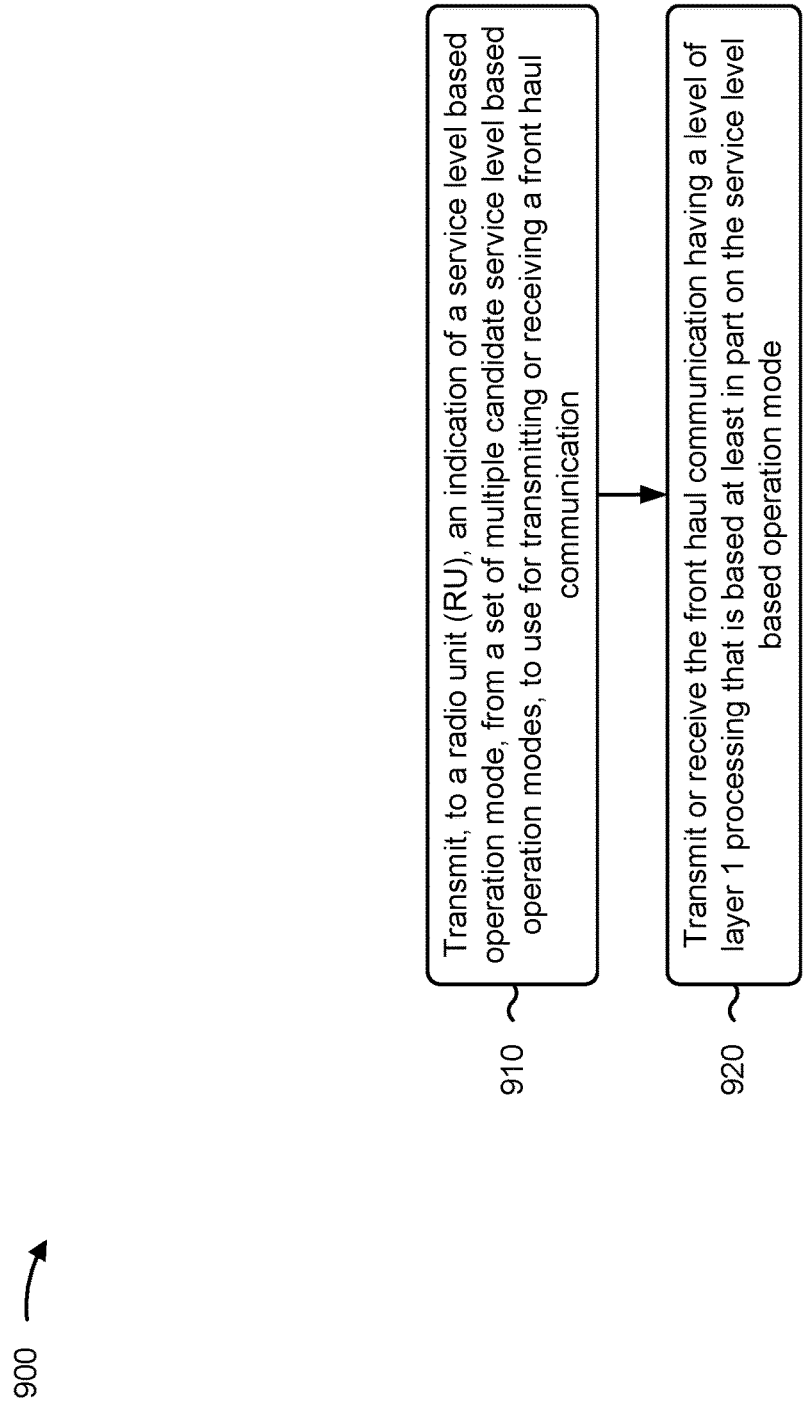

FIG. 9 is a diagram illustrating an example process 900 performed, for example, by a DU, in accordance with the present disclosure. Example process 900 is an example where the DU (e.g., DU 330) performs operations associated with service level based operation modes of RUs.

As shown in FIG. 9, in some aspects, process 900 may include transmitting, to an RU, an indication of a service level based operation mode, from a set of multiple candidate service level based operation modes, to use for transmitting or receiving a front haul communication (block 910). For example, the DU (e.g., using communication manager 150 and/or transmission component 1104, depicted in FIG. 11) may transmit, to an RU, an indication of a service level based operation mode, from a set of multiple candidate service level based operation modes, to use for transmitting or receiving a front haul communication, as described above.

As further shown in FIG. 9, in some aspects, process 900 may include transmitting or receiving the front haul communication having a level of L1 processing that is based at least in part on the service level based operation mode (block 920). For example, the DU (e.g., using communication manager 150 and/or transmission component 1104, depicted in FIG. 11) may transmit or receive the front haul communication having a level of L1 processing that is based at least in part on the service level based operation mode, as described above.

Process 900 may include additional aspects, such as any single aspect or any combination of aspects described below and/or in connection with one or more other processes described elsewhere herein.

In a first aspect, a first candidate service level based operation mode of the set of multiple candidate service level based operation modes is associated with the RU providing services to one or more UEs having an amount of traffic that satisfies a traffic threshold, and a second candidate service level based operation mode of the set of multiple candidate service level based operation modes is associated with the DU providing services to one or more UEs having an amount of traffic that fails to satisfy the traffic threshold.

In a second aspect, alone or in combination with the first aspect, a first candidate service level based operation mode of the set of multiple candidate service level based operation modes is associated with the DU providing services to one or more UEs having traffic associated with a first set of traffic types having complexity that satisfies a complexity threshold, and a second candidate service level based operation mode of the set of multiple candidate service level based operation modes is associated with the DU providing services to one or more UEs having traffic associated with a second set of traffic types having complexity that fails to satisfy the complexity threshold.

In a third aspect, alone or in combination with one or more of the first and second aspects, a first candidate service level based operation mode of the set of multiple candidate service level based operation modes is associated with the DU providing services to one or more UEs via a first channel type of a first set of channel types, and a second candidate service level based operation mode of the set of multiple candidate service level based operation modes is associated with the DU providing services to one or more UEs via a second channel type of a second set of channel types.

In a fourth aspect, alone or in combination with one or more of the first through third aspects, a first candidate service level based operation mode of the set of multiple candidate service level based operation modes is associated with the DU performing a first amount of L1 processing based at least in part on the first candidate service level based operation mode being a low service mode, and a second candidate service level based operation mode of the set of multiple candidate service level based operation modes is associated with the DU performing a second amount of L1 processing, that is greater than the first amount of L1 processing, based at least in part on the second candidate service level based operation mode being a high service mode.

In a fifth aspect, alone or in combination with one or more of the first through fourth aspects, a first candidate service level based operation mode of the set of multiple candidate service level based operation modes is associated with the front haul communication having an indication of a message payload, and a second candidate service level based operation mode of the set of multiple candidate service level based operation modes is associated with the front haul communication having an indication of a wave form associated with the message payload.

In a sixth aspect, alone or in combination with one or more of the first through fifth aspects, process 900 includes receiving, from the RU, an indication of support for dynamic switching of service level based operation modes.

In a seventh aspect, alone or in combination with one or more of the first through sixth aspects, transmitting or receiving the front haul communication comprises performing the level of L1 processing of a communication for transmitting to a UE, and transmitting an indication of a payload of the communication or an indication of a sample of signaling for transmission to the UE based at least in part on the service level based operation mode.

In an eighth aspect, alone or in combination with one or more of the first through seventh aspects, transmitting or receiving the front haul communication comprises receiving the front haul communication from the RU, and performing an additional level of L1 processing of the front haul communication, the additional level of L1 processing based at least in part on the level of L1 processing.

In a ninth aspect, alone or in combination with one or more of the first through eighth aspects, process 900 includes transmitting, to the RU, an indication of an updated service level based operation mode, from the set of multiple candidate service level based operation modes, to use for transmitting or receiving a subsequent front haul communication, and transmitting or receiving the subsequent front haul communication having an updated level of L1 processing that is based at least in part on the updated service level based operation mode.

In a tenth aspect, alone or in combination with one or more of the first through ninth aspects, process 900 includes transmitting, to an additional RU associated with the DU, an indication of a different service level based operation mode that is different from the service level based operation mode indicated for the RU.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
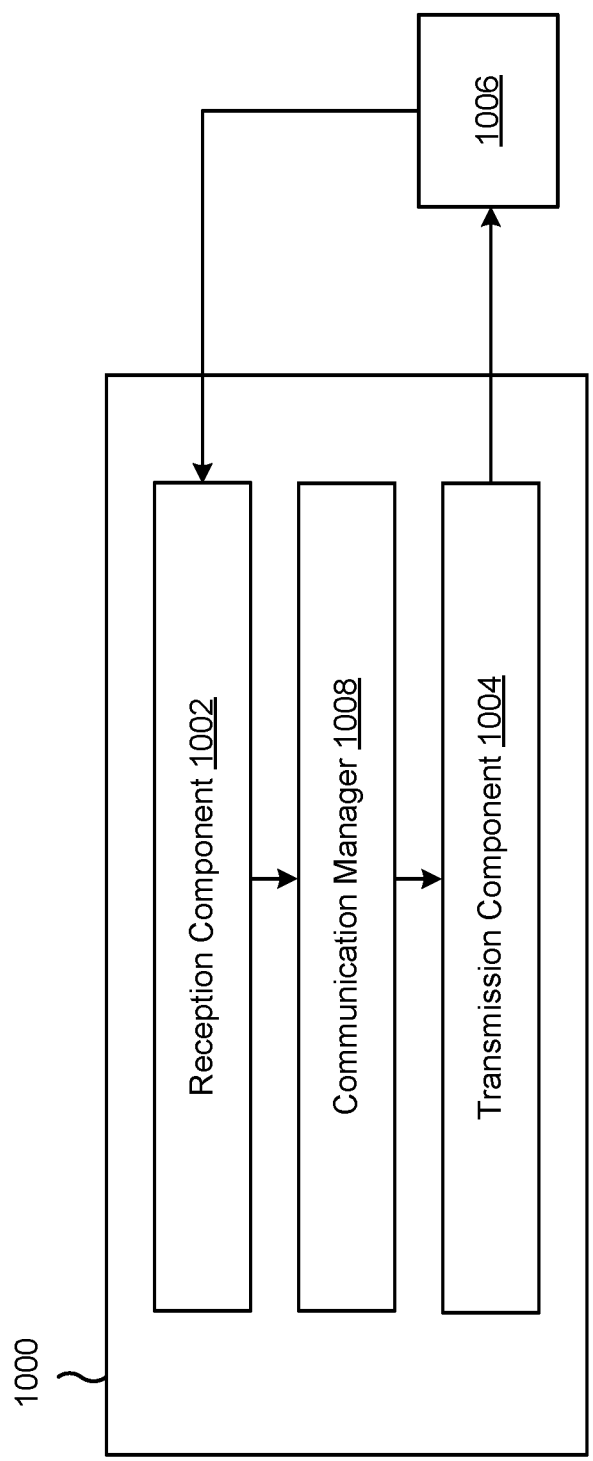
FIGS. 10 and 11 are diagrams of example apparatuses for wireless communication, in accordance with the present disclosure.

FIG. 10 is a diagram of an example apparatus 1000 for wireless communication. The apparatus 1000 may be an RU, or an RU may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a base station, or another wireless communication device) using the reception component 1002 and the transmission component 1004. As further shown, the apparatus 1000 may include a communication manager 1008 (e.g., the communication manager 150).

In some aspects, the apparatus 1000 may be configured to perform one or more operations described herein in connection with FIGS. 5-7. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the RU described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the RU described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the RU described in connection with FIG. 2. In some aspects, the transmission component 1004 may be co-located with the reception component 1002 in a transceiver.

The reception component 1002 may receive, from a DU, an indication of a service level based operation mode, from a set of multiple candidate service level based operation modes, to use for transmitting or receiving a front haul communication. The transmission component 1004 may transmit or receive the front haul communication having a level of L1 processing that is based at least in part on the service level based operation mode.

The transmission component 1004 may transmit, to the DU, an indication of support for dynamic switching of service level based operation modes.

The transmission component 1004 may transmit to a UE, or receive from the UE, a communication associated with the front haul communication.

The reception component 1002 may receive, from the DU, an indication of an updated service level based operation mode, from the set of multiple candidate service level based operation modes, to use for transmitting or receiving a subsequent front haul communication.

The transmission component 1004 may transmit or receive the subsequent front haul communication having an updated level of L1 processing that is based at least in part on the updated service level based operation mode.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

Figure 11:
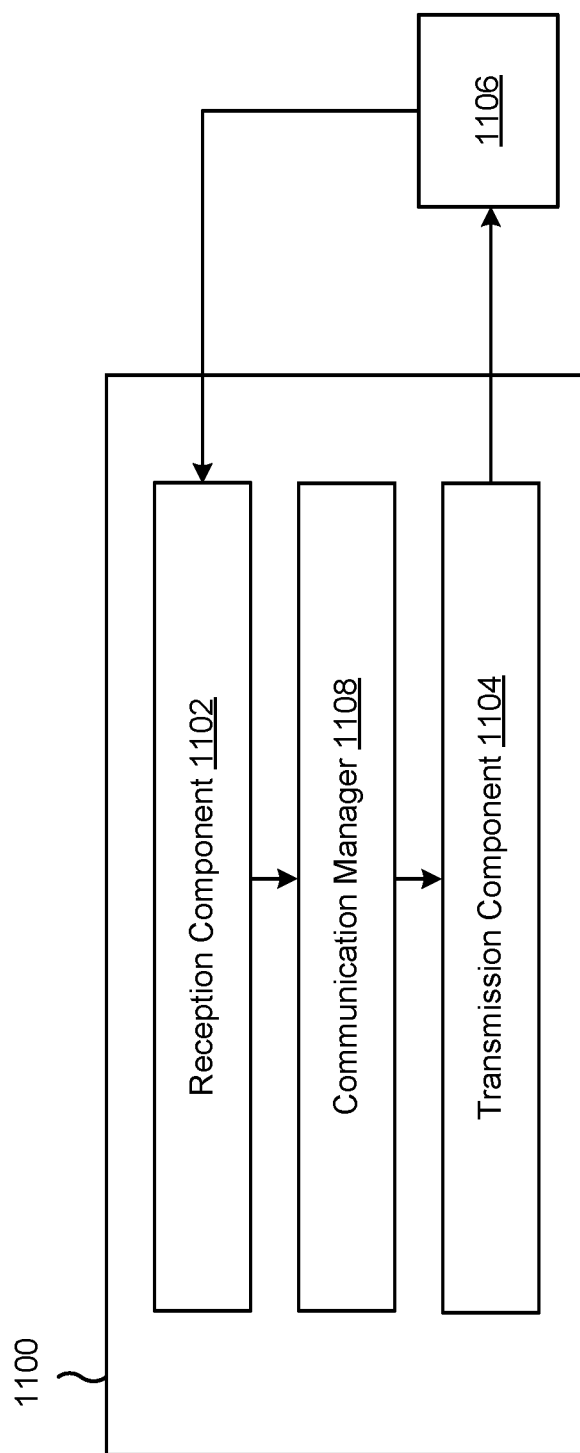

FIG. 11 is a diagram of an example apparatus 1100 for wireless communication. The apparatus 1100 may be a DU, or a DU may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include a communication manager 1108 (e.g., the communication manager 150.

In some aspects, the apparatus 1100 may be configured to perform one or more operations described herein in connection with FIGS. 5-7. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the DU described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the DU described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the DU described in connection with FIG. 2. In some aspects, the transmission component 1104 may be co-located with the reception component 1102 in a transceiver.

The transmission component 1104 may transmit, to an RU, an indication of a service level based operation mode, from a set of multiple candidate service level based operation modes, to use for transmitting or receiving a front haul communication. The transmission component 1104 may transmit or receive the front haul communication having a level of L1 processing that is based at least in part on the service level based operation mode.

The reception component 1102 may receive, from the RU, an indication of support for dynamic switching of service level based operation modes.

The transmission component 1104 may transmit, to the RU, an indication of an updated service level based operation mode, from the set of multiple candidate service level based operation modes, to use for transmitting or receiving a subsequent front haul communication.

The transmission component 1104 may transmit or receive the subsequent front haul communication having an updated level of L1 processing that is based at least in part on the updated service level based operation mode.

The transmission component 1104 may transmit, to an additional RU associated with the DU, an indication of a different service level based operation mode that is different from the service level based operation mode indicated for the RU.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

The following provides an overview of some Aspects of the present disclosure:

Aspect 1: A method of wireless communication performed by a radio unit (RU), comprising: receiving, from a distributed unit (DU), an indication of a service level based operation mode, from a set of multiple candidate service level based operation modes, to use for transmitting or receiving a front haul communication; and transmitting or receiving the front haul communication having a level of L1 processing that is based at least in part on the service level based operation mode.

Aspect 2: The method of Aspect 1, wherein a first candidate service level based operation mode of the set of multiple candidate service level based operation modes is associated with providing services to one or more user equipments (UEs) having an amount of traffic that satisfies a traffic threshold, and wherein a second candidate service level based operation mode of the set of multiple candidate service level based operation modes is associated with providing services to one or more UEs having an amount of traffic that fails to satisfy the traffic threshold.

Aspect 3: The method of any of Aspects 1-2, wherein a first candidate service level based operation mode of the set of multiple candidate service level based operation modes is associated with providing services to one or more user equipments (UEs) having traffic associated with a first set of traffic types having complexity that satisfies a complexity threshold, and wherein a second candidate service level based operation mode of the set of multiple candidate service level based operation modes is associated with providing services to one or more UEs having traffic associated with a second set of traffic types having complexity that fails to satisfy the complexity threshold.

Aspect 4: The method of any of Aspects 1-3, wherein a first candidate service level based operation mode of the set of multiple candidate service level based operation modes is associated with providing services to one or more user equipments (UEs) via a first channel type of a first set of channel types, and wherein a second candidate service level based operation mode of the set of multiple candidate service level based operation modes is associated with providing services to one or more UEs via a second channel type of a second set of channel types.

Aspect 5: The method of any of Aspects 1-4, wherein a first candidate service level based operation mode of the set of multiple candidate service level based operation modes is associated with performing a first amount of layer 1 processing based at least in part on the first candidate service level based operation mode being a low service mode, and wherein a second candidate service level based operation mode of the set of multiple candidate service level based operation modes is associated with performing a second amount of layer 1 processing, that is greater than the first amount of layer 1 processing, based at least in part on the second candidate service level based operation mode being a high service mode.

Aspect 6: The method of any of Aspects 1-5, wherein a first candidate service level based operation mode of the set of multiple candidate service level based operation modes is associated with the front haul communication having an indication of a message payload, and wherein a second candidate service level based operation mode of the set of multiple candidate service level based operation modes is associated with the front haul communication having an indication of a wave form associated with the message payload.

Aspect 7: The method of any of Aspects 1-6, further comprising: transmitting, to the DU, an indication of support for dynamic switching of service level based operation modes.

Aspect 8: The method of any of Aspects 1-7, further comprising: transmitting to a user equipment (UE), or receiving from the UE, a communication associated with the front haul communication.

Aspect 9: The method of Aspect 8, wherein transmitting or receiving the front haul communication comprises: performing the level of layer 1 processing of the communication received from the UE, and transmitting an indication of a payload of the communication received from the UE or an indication of a sample of received signaling associated with the communication received from the UE based at least in part on the service level based operation mode.

Aspect 10: The method of Aspect 8, wherein transmitting or receiving the front haul communication comprises: performing an additional level of layer 1 processing of the front haul communication, the additional L1 processing of the front haul communication, the additional L1 processing based at least in part on the level of L1 processing performed by the DU, and transmitting a communication, associated with the front haul communication, to the UE after performing the additional L1 processing.

Aspect 11: The method of any of Aspects 1-10, further comprising: receiving, from the DU, an indication of an updated service level based operation mode, from the set of multiple candidate service level based operation modes, to use for transmitting or receiving a subsequent front haul communication; and transmitting or receiving the subsequent front haul communication having an updated level of layer 1 processing that is based at least in part on the updated service level based operation mode.

Aspect 12: The method of any of Aspects 1-11, wherein an additional RU associated with the DU is configured to use a different service level based operation mode that is different from the service level based operation mode indicated for the RU.

Aspect 13: A method of wireless communication performed by a distributed unit (DU), comprising: transmitting, to a radio unit (RU), an indication of a service level based operation mode, from a set of multiple candidate service level based operation modes, to use for transmitting or receiving a front haul communication; and transmitting or receiving the front haul communication having a level of layer 1 processing that is based at least in part on the service level based operation mode.

Aspect 14: The method of Aspect 13, wherein a first candidate service level based operation mode of the set of multiple candidate service level based operation modes is associated with the RU providing services to one or more user equipments (UEs) having an amount of traffic that satisfies a traffic threshold, and wherein a second candidate service level based operation mode of the set of multiple candidate service level based operation modes is associated with the DU providing services to one or more UEs having an amount of traffic that fails to satisfy the traffic threshold.

Aspect 15: The method of any of Aspects 13-14, wherein a first candidate service level based operation mode of the set of multiple candidate service level based operation modes is associated with the DU providing services to one or more user equipments (UEs) having traffic associated with a first set of traffic types having complexity that satisfies a complexity threshold, and wherein a second candidate service level based operation mode of the set of multiple candidate service level based operation modes is associated with the DU providing services to one or more UEs having traffic associated with a second set of traffic types having complexity that fails to satisfy the complexity threshold.

Aspect 16: The method of any of Aspects 13-15, wherein a first candidate service level based operation mode of the set of multiple candidate service level based operation modes is associated with the DU providing services to one or more user equipments (UEs) via a first channel type of a first set of channel types, and wherein a second candidate service level based operation mode of the set of multiple candidate service level based operation modes is associated with the DU providing services to one or more UEs via a second channel type of a second set of channel types.

Aspect 17: The method of any of Aspects 13-16, wherein a first candidate service level based operation mode of the set of multiple candidate service level based operation modes is associated with the DU performing a first amount of layer 1 processing based at least in part on the first candidate service level based operation mode being a low service mode, and wherein a second candidate service level based operation mode of the set of multiple candidate service level based operation modes is associated with the DU performing a second amount of layer 1 processing, that is greater than the first amount of layer 1 processing, based at least in part on the second candidate service level based operation mode being a high service mode.

Aspect 18: The method of any of Aspects 13-17, wherein a first candidate service level based operation mode of the set of multiple candidate service level based operation modes is associated with the front haul communication having an indication of a message payload, and wherein a second candidate service level based operation mode of the set of multiple candidate service level based operation modes is associated with the front haul communication having an indication of a wave form associated with the message payload.

Aspect 19: The method of any of Aspects 13-18, further comprising: receiving, from the RU, an indication of support for dynamic switching of service level based operation modes.

Aspect 20: The method of any of Aspects 13-19, wherein transmitting or receiving the front haul communication comprises: performing the level of layer 1 processing of a communication for transmitting to a user equipment UE, and transmitting an indication of a payload of the communication or an indication of a sample of signaling for transmission to the UE based at least in part on the service level based operation mode.

Aspect 21: The method of any of Aspects 13-20, wherein transmitting or receiving the front haul communication comprises: receiving the front haul communication from the RU, and performing an additional level of layer 1 processing of the front haul communication, the additional level of layer 1 processing based at least in part on the level of layer 1 processing.

Aspect 22: The method of any of Aspects 13-21, further comprising: transmitting, to the RU, an indication of an updated service level based operation mode, from the set of multiple candidate service level based operation modes, to use for transmitting or receiving a subsequent front haul communication; and transmitting or receiving the subsequent front haul communication having an updated level of layer 1 processing that is based at least in part on the updated service level based operation mode.

Aspect 23: The method of any of Aspects 13-22, further comprising: transmitting, to an additional RU associated with the DU, an indication of a different service level based operation mode that is different from the service level based operation mode indicated for the RU.

Aspect 24: An apparatus for wireless communication at a device, comprising a processor; memory coupled with the processor; and instructions stored in the memory and executable by the processor to cause the apparatus to perform the method of one or more of Aspects 1-23.

Aspect 25: A device for wireless communication, comprising a memory and one or more processors coupled to the memory, the one or more processors configured to perform the method of one or more of Aspects 1-23.

Aspect 26: An apparatus for wireless communication, comprising at least one means for performing the method of one or more of Aspects 1-23.

Aspect 27: A non-transitory computer-readable medium storing code for wireless communication, the code comprising instructions executable by a processor to perform the method of one or more of Aspects 1-23.

Aspect 28: A non-transitory computer-readable medium storing a set of instructions for wireless communication, the set of instructions comprising one or more instructions that, when executed by one or more processors of a device, cause the device to perform the method of one or more of Aspects 1-23.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A radio unit (RU) for wireless communication, comprising:
    a memory; and
    one or more processors, coupled to the memory, configured to:
        transmit, to a distributed unit (DU), an indication of support for dynamic switching of service level based operation modes to enable dynamic infra-functional splits;
        receive, from the DU, an indication of a service level based operation mode to use for front haul communication according to a functional split that is associated with performing a first amount of layer 1 (L1) processing operations at the RU and a second amount of L1 processing operations at the DU,
            wherein the service level based operation mode is from a set of multiple candidate service level based operation modes that includes an additional service level based operation mode associated with an additional functional split,
            wherein different functional splits, associated with the set of multiple candidate service level based operation modes, are configured for different physical channels or for different service rates, and
            wherein each functional split is associated with performing a first a respective amount of uplink and downlink layer 1 (L1) processing operations at the RU and a second another respective amount of uplink and downlink L1 processing operations at the DU; and
        transmit or receive the front haul communication having a first amount of L1 processing based at least in part on the service level based operation mode.

2. The RU of claim 1, wherein a first candidate service level based operation mode of the set of multiple candidate service level based operation modes is associated with providing services to one or more user equipments (UEs) having an amount of traffic that satisfies a traffic threshold, and
    wherein a second candidate service level based operation mode of the set of multiple candidate service level based operation modes is associated with providing services to one or more UEs having an amount of traffic that fails to satisfy the traffic threshold.

3. The RU of claim 1, wherein a first candidate service level based operation mode of the set of multiple candidate service level based operation modes is associated with providing services to one or more user equipments (UEs) having traffic associated with a first set of traffic types having complexity that satisfies a complexity threshold, and wherein a second candidate service level based operation mode of the set of multiple candidate service level based operation modes is associated with providing services to one or more UEs having traffic associated with a second set of traffic types having complexity that fails to satisfy the complexity threshold.

4. The RU of claim 1, wherein a first candidate service level based operation mode of the set of multiple candidate service level based operation modes is associated with providing services to one or more user equipments (UEs) via a first channel type of a first set of channel types, and wherein a second candidate service level based operation mode of the set of multiple candidate service level based operation modes is associated with providing services to one or more UEs via a second channel type of a second set of channel types.

5. The RU of claim 1, wherein a first candidate service level based operation mode of the set of multiple candidate service level based operation modes is associated with performing an amount of L1 processing based at least in part on the first candidate service level based operation mode being a low service mode, and wherein a second candidate service level based operation mode of the set of multiple candidate service level based operation modes is associated with performing a different amount of L1 processing, that is greater than the amount of L1 processing, based at least in part on the second candidate service level based operation mode being a high service mode.

6. The RU of claim 1, wherein the one or more processors are further configured to:

transmit to a user equipment (UE), or receive from the UE, a communication associated with the front haul communication.

7. The RU of claim 6, wherein the one or more processors, to transmit or receive the front haul communication, are configured to:

perform the first amount of L1 processing of the communication received from the UE, and transmit an indication of a payload of the communication received from the UE or an indication of a sample of received signaling associated with the communication received from the UE based at least in part on the service level based operation mode.

8. The RU of claim 6, wherein the one or more processors, to transmit or receive the front haul communication, are configured to:

perform additional L1 processing of the front haul communication, the additional L1 processing based at least in part on the first amount of L1 processing performed by the DU, and transmit a communication, associated with the front haul communication, to the UE after performing the additional L1 processing.

9. The RU of claim 1, wherein the one or more processors are further configured to:

receive, from the DU, an indication of an updated service level based operation mode, from the set of multiple candidate service level based operation modes, to use for transmitting or receiving a subsequent front haul communication; and transmit or receive the subsequent front haul communication having an updated amount of L1 processing that is based at least in part on the updated service level based operation mode.

10. The RU of claim 1, wherein an additional RU associated with the DU is configured to use a different service level based operation mode that is different from the service level based operation mode indicated for the RU.

11. A radio unit (RU) for wireless communication, comprising:

a memory; and one or more processors, coupled to the memory, configured to:

receive, from a distributed unit (DU), an indication of a service level based operation mode to use for front haul communication according to a functional split that is associated with performing a first amount of layer 1 (L1) processing operations at the RU and a second amount of L1 processing operations at the DU, wherein the service level based operation mode is from a set of multiple candidate service level based operation modes that includes an additional service level based operation mode associated with an additional functional split, wherein different functional splits, associated with the set of multiple candidate service level based operation modes, are configured for different physical channels or for different service rates, and wherein each functional split is associated with performing a first a respective amount of uplink and downlink layer 1 (L1) processing operations at the RU and a second another respective amount of uplink and downlink L1 processing operations at the DU;

transmit or receive the front haul communication having a first amount of L1 processing based at least in part on the service level based operation mode;

wherein a first candidate service level based operation mode of the set of multiple candidate service level based operation modes is associated with the front haul communication having an indication of a message payload, and wherein a second candidate service level based operation mode of the set of multiple candidate service level based operation modes is associated with the front haul communication having an indication of a wave form associated with the message payload.

12. A distributed unit (DU) for wireless communication, comprising:

a memory; and one or more processors, coupled to the memory, configured to:

receive, from a radio unit (RU), an indication of support for dynamic switching of service level based operation modes to enable dynamic infra-functional splits;

transmit, to the RU, an indication of a service level based operation mode to use for front haul communication according to a functional split that is associated with performing a first amount of layer 1 (L1) processing operations at the RU and a second amount of L1 processing operations at the DU, wherein the service level based operation mode is from a set of multiple candidate service level based operation modes that includes an additional service level based operation mode associated with an additional functional split,
wherein different functional splits, associated with the set of multiple candidate service level based operation modes, are configured for different physical channels or for different service rates, and
wherein each functional split is associated with performing a first a respective amount of uplink and downlink layer 1 (L1) processing operations at the RU and a second another respective amount of uplink and downlink L1 processing operations at the DU; and
transmit or receive the front haul communication having the second a first amount of L1 processing based at least in part on the service level based operation mode.

13. The DU of claim 12, wherein a first candidate service level based operation mode of the set of multiple candidate service level based operation modes is associated with the RU providing services to one or more user equipments (UEs) having an amount of traffic that satisfies a traffic threshold, and
wherein a second candidate service level based operation mode of the set of multiple candidate service level based operation modes is associated with the DU providing services to one or more UEs having an amount of traffic that fails to satisfy the traffic threshold.

14. The DU of claim 12, wherein a first candidate service level based operation mode of the set of multiple candidate service level based operation modes is associated with the DU providing services to one or more user equipments (UEs) having traffic associated with a first set of traffic types having complexity that satisfies a complexity threshold, and
wherein a second candidate service level based operation mode of the set of multiple candidate service level based operation modes is associated with the DU providing services to one or more UEs having traffic associated with a second set of traffic types having complexity that fails to satisfy the complexity threshold.

15. The DU of claim 12, wherein a first candidate service level based operation mode of the set of multiple candidate service level based operation modes is associated with the DU providing services to one or more user equipments (UEs) via a first channel type of a first set of channel types, and
wherein a second candidate service level based operation mode of the set of multiple candidate service level based operation modes is associated with the DU providing services to one or more UEs via a second channel type of a second set of channel types.

16. The DU of claim 12, wherein a first candidate service level based operation mode of the set of multiple candidate service level based operation modes is associated with the DU performing an amount of L1 processing based at least in part on the first candidate service level based operation mode being a low service mode, and
wherein a second candidate service level based operation mode of the set of multiple candidate service level based operation modes is associated with the DU performing a different amount of L1 processing, that is greater than the amount of L1 processing, based at least in part on the second candidate service level based operation mode being a high service mode.

17. The DU of claim 12, wherein the one or more processors, to transmit or receive the front haul communication, are configured to:
perform the second first amount of L1 processing of a communication for transmitting to a user equipment (UE), and
transmit an indication of a payload of the communication or an indication of a sample of signaling for transmission to the UE based at least in part on the service level based operation mode.

18. The DU of claim 12, wherein the one or more processors, to transmit or receive the front haul communication, are configured to:
receive the front haul communication from the RU, and perform an additional amount of L1 processing of the front haul communication, the additional amount of L1 processing based at least in part on the second first amount of L1 processing.

19. The DU of claim 12, wherein the one or more processors are further configured to:
transmit, to the RU, an indication of an updated service level based operation mode, from the set of multiple candidate service level based operation modes, to use for transmitting or receiving a subsequent front haul communication; and
transmit or receive the subsequent front haul communication having an updated amount of L1 processing that is based at least in part on the updated service level based operation mode.

20. The DU of claim 12, wherein the one or more processors are further configured to:
transmit, to an additional RU associated with the DU, an indication of a different service level based operation mode that is different from the service level based operation mode indicated for the RU.

21. A distributed unit (DU) for wireless communication, comprising:
a memory; and
one or more processors, coupled to the memory, configured to:
transmit, to a radio unit (RU), an indication of a service level based operation mode to use for front haul communication according to a functional split that is associated with performing a first amount of layer 1 (L1) processing operations at the RU and a second amount of L1 processing operations at the DU,
wherein the service level based operation mode is from a set of multiple candidate service level based operation modes that includes an additional service level based operation mode associated with an additional functional split,
wherein different functional splits, associated with the set of multiple candidate service level based operation modes, are configured for different physical channels or for different service rates, and
wherein each functional split is associated with performing a first a respective amount of uplink and downlink layer 1 (L1) processing operations at the RU and a second another respective amount of uplink and downlink L1 processing operations at the DU; and
transmit or receive the front haul communication having the second a first amount of L1 processing based at least in part on the service level based operation mode;

wherein a first candidate service level based operation mode of the set of multiple candidate service level based operation modes is associated with the front haul communication having an indication of a message payload, and wherein a second candidate service level based operation mode of the set of multiple candidate service level based operation modes is associated with the front haul communication having an indication of a wave form associated with the message payload.

22. A method of wireless communication performed by a distributed unit (DU), comprising:

receiving, from a radio unit (RU), an indication of support for dynamic switching of service level based operation modes to enable dynamic infra-functional splits;

transmitting, the RU, an indication of a service level based operation mode to use for front haul communication according to a functional split that is associated with performing a first amount of layer 1 (L1) processing operations at the RU and a second amount of L1 processing operations at the DU, wherein the service level based operation mode is from a set of multiple candidate service level based operation modes that includes an additional service level based operation mode associated with an additional functional split, wherein different functional splits, associated with the set of multiple candidate service level based operation modes, are configured for different physical channels or for different service rates, wherein each functional split is associated with performing a first a respective amount of uplink and downlink layer 1 (L1) processing operations at the RU and a second another respective amount of uplink and downlink L1 processing operations at the DU; and transmitting or receiving the front haul communication having the second a first amount of L1 processing based at least in part on the service level based operation mode.

23. The method of claim 22, wherein a first candidate service level based operation mode of the set of multiple candidate service level based operation modes is associated with the RU providing services to one or more user equipments (UEs) having an amount of traffic that satisfies a traffic threshold, and wherein a second candidate service level based operation mode of the set of multiple candidate service level based operation modes is associated with the DU providing services to one or more UEs having an amount of traffic that fails to satisfy the traffic threshold.

24. The method of claim 22, wherein a first candidate service level based operation mode of the set of multiple candidate service level based operation modes is associated with the DU providing services to one or more user equipments (UEs) having traffic associated with a first set of traffic types having complexity that satisfies a complexity threshold, and wherein a second candidate service level based operation mode of the set of multiple candidate service level based operation modes is associated with the DU providing services to one or more UEs having traffic associated with a second set of traffic types having complexity that fails to satisfy the complexity threshold.

25. The method of claim 22, further comprising:

transmitting, to an additional RU associated with the DU, an indication of a different service level based operation mode that is different from the service level based operation mode indicated for the RU.

26. A method of wireless communication performed by a radio unit (RU), comprising:

transmitting, to a distributed unit (DU), an indication of support for dynamic switching of service level based operation modes to enable dynamic infra-functional splits;

receiving, from the DU, an indication of a service level based operation mode to use for front haul communication according to a functional split that is associated with performing a first amount of layer 1 (L1) processing operations at the RU and a second amount of L1 processing operations at the DU, wherein the service level based operation mode is from a set of multiple candidate service level based operation modes that includes an additional service level based operation mode associated with an additional functional split, wherein different functional splits, associated with the set of multiple candidate service level based operation modes, are configured for different physical channels or for different service rates, and wherein each functional split is associated with performing a first a respective amount of uplink and downlink layer 1 (L1) processing operations at the RU and a second another respective amount of uplink and downlink L1 processing operations at the DU; and transmitting or receiving the front haul communication having a first amount of L1 processing that is based at least in part on the service level based operation mode.

27. The method of claim 26, wherein a first candidate service level based operation mode of the set of multiple candidate service level based operation modes is associated with providing services to one or more user equipments (UEs) having an amount of traffic that satisfies a traffic threshold, and wherein a second candidate service level based operation mode of the set of multiple candidate service level based operation modes is associated with providing services to one or more UEs having an amount of traffic that fails to satisfy the traffic threshold.

28. The method of claim 26, wherein a first candidate service level based operation mode of the set of multiple candidate service level based operation modes is associated with providing services to one or more user equipments (UEs) having traffic associated with a first set of traffic types having complexity that satisfies a complexity threshold, and wherein a second candidate service level based operation mode of the set of multiple candidate service level based operation modes is associated with providing services to one or more UEs having traffic associated with a second set of traffic types having complexity that fails to satisfy the complexity threshold.

* * * * *